United States Patent
McDonald et al.

(10) Patent No.: US 9,839,974 B2
(45) Date of Patent: Dec. 12, 2017

(54) FORMING WHITE METAL OXIDE FILMS BY OXIDE STRUCTURE MODIFICATION OR SUBSURFACE CRACKING

(71) Applicant: Apple Inc., Cupertino, CA (US)

(72) Inventors: Daniel T. McDonald, San Francisco, CA (US); Michael S. Nashner, San Jose, CA (US); Peter N. Russell-Clarke, San Francisco, CA (US); Masashige Tatebe, Kakogawa (JP)

(73) Assignee: Apple Inc., Cupertino, CA (US)

( * ) Notice: Subject to any disclaimer, the term of this patent is extended or adjusted under 35 U.S.C. 154(b) by 65 days.

(21) Appl. No.: 14/261,060

(22) Filed: Apr. 24, 2014

(65) Prior Publication Data

US 2015/0132541 A1    May 14, 2015

Related U.S. Application Data

(60) Provisional application No. 61/903,890, filed on Nov. 13, 2013.

(51) Int. Cl.
*C25D 11/00*    (2006.01)
*B23K 26/00*    (2014.01)
(Continued)

(52) U.S. Cl.
CPC ...... *B23K 26/0081* (2013.01); *B23K 26/0057* (2013.01); *C25D 11/18* (2013.01); *C25D 11/04* (2013.01); *Y10T 428/24471* (2015.01)

(58) Field of Classification Search
CPC .. G02B 2027/0118; H01L 33/60; C25D 11/14
See application file for complete search history.

(56) References Cited

U.S. PATENT DOCUMENTS

| | | | |
|---|---|---|---|
| 3,747,117 A | 7/1973 | Fechter | |
| 3,765,994 A | 10/1973 | Quaintance et al. | |

(Continued)

FOREIGN PATENT DOCUMENTS

| | | | |
|---|---|---|---|
| CN | 85103365 A | 12/1986 | |
| CN | 1336878 A | 2/2002 | |

(Continued)

OTHER PUBLICATIONS

Furneaux et al., "The formation of controlled-porosity membranes from anodically oxidized Aluminium", Nature, vol. 337, Jan. 1989, pp. 147-149.

(Continued)

*Primary Examiner* — Julia Slutsker
(74) *Attorney, Agent, or Firm* — Downey Brand LLP

(57) ABSTRACT

The embodiments described herein relate to forming white appearing metal oxide films by forming cracks within the metal oxide films. In some embodiments, the methods involve directing a laser beam at a metal oxide film causing portions of the metal oxide film to melt, cool, contract, and crack. The cracks have irregular surfaces that can diffusely reflect visible light incident a top surface of the metal oxide film, thereby imparting a white appearance to the metal oxide film. In some embodiments, the cracks are formed beneath a top surface of a metal oxide film, thereby leaving a continuous and uninterrupted metal oxide film top surface.

20 Claims, 18 Drawing Sheets

(51) Int. Cl.
*C25D 11/18* (2006.01)
*C25D 11/04* (2006.01)

(56) References Cited

U.S. PATENT DOCUMENTS

| | | |
|---|---|---|
| 4,210,499 A | 7/1980 | Hirono et al. |
| 4,519,876 A | 5/1985 | Lee et al. |
| 4,753,863 A | 6/1988 | Spanjer |
| 4,972,061 A | 11/1990 | Duley et al. |
| 5,472,788 A | 12/1995 | Benitez-Garriga |
| 5,510,015 A | 4/1996 | Martinez et al. |
| 6,083,871 A | 7/2000 | Fromson et al. |
| 6,127,050 A | 10/2000 | Fromson et al. |
| 6,139,713 A | 10/2000 | Masuda et al. |
| 6,180,415 B1 | 1/2001 | Schultz et al. |
| 6,238,847 B1 | 5/2001 | Axtell, III et al. |
| 6,271,162 B1 | 8/2001 | Haug et al. |
| 6,548,264 B1 | 4/2003 | Tan et al. |
| 6,613,161 B2 | 9/2003 | Zheng et al. |
| 6,777,098 B2 | 8/2004 | Yeo |
| 6,821,305 B2 | 11/2004 | Yan |
| 6,866,710 B2 | 3/2005 | Heider et al. |
| 6,884,336 B2 | 4/2005 | Kia et al. |
| 7,144,627 B2 | 12/2006 | Halas et al. |
| 7,173,276 B2 | 2/2007 | Choi et al. |
| 7,187,396 B2 | 3/2007 | Carroll, Jr. et al. |
| 8,029,554 B2 | 10/2011 | Holman et al. |
| 8,993,921 B2 | 3/2015 | Browning et al. |
| 9,181,629 B2 | 11/2015 | Browning et al. |
| 9,493,876 B2 | 11/2016 | Browning et al. |
| 2002/0132105 A1 | 9/2002 | Robertson et al. |
| 2002/0171732 A1 | 11/2002 | Carroll et al. |
| 2003/0001150 A1 | 1/2003 | Iwasaki et al. |
| 2003/0176563 A1 | 9/2003 | Kuroda et al. |
| 2004/0194235 A1 | 10/2004 | Yan |
| 2005/0069683 A1 | 3/2005 | Aylward et al. |
| 2005/0175836 A1 | 8/2005 | Kuehnle et al. |
| 2005/0211566 A1 | 9/2005 | Tomita et al. |
| 2006/0066579 A1* | 3/2006 | Bladt .............. G09F 9/305 345/173 |
| 2006/0197953 A1 | 9/2006 | Perez et al. |
| 2006/0254922 A1 | 11/2006 | Brevnov et al. |
| 2006/0260947 A1 | 11/2006 | Kia et al. |
| 2007/0141342 A1 | 6/2007 | Kuehnle et al. |
| 2007/0190298 A1 | 8/2007 | Hampden-Smith et al. |
| 2007/0281140 A1 | 12/2007 | Haubrich et al. |
| 2007/0284261 A1 | 12/2007 | Shimotani et al. |
| 2008/0026207 A1 | 1/2008 | Fink-Petri et al. |
| 2008/0057293 A1 | 3/2008 | Hatanaka et al. |
| 2008/0073220 A1 | 3/2008 | Doyle |
| 2008/0274375 A1 | 11/2008 | Ng et al. |
| 2009/0022995 A1 | 1/2009 | Graham et al. |
| 2009/0120358 A1 | 5/2009 | Harada et al. |
| 2009/0130436 A1 | 5/2009 | Harada et al. |
| 2009/0181262 A1 | 7/2009 | Isaksson et al. |
| 2009/0323171 A1 | 12/2009 | Gibson |
| 2010/0015558 A1 | 1/2010 | Jarvis et al. |
| 2010/0183869 A1 | 7/2010 | Lin et al. |
| 2010/0187119 A1 | 7/2010 | Almond et al. |
| 2010/0215926 A1 | 8/2010 | Askin et al. |
| 2010/0224026 A1 | 9/2010 | Brennan Fournet et al. |
| 2011/0008602 A1* | 1/2011 | Peeters .............. B82Y 20/00 428/220 |
| 2011/0123737 A1 | 5/2011 | Nashner |
| 2011/0193928 A1 | 8/2011 | Zhang |
| 2011/0284381 A1 | 11/2011 | Cabot et al. |
| 2012/0021120 A1 | 1/2012 | Feldstein |
| 2013/0224406 A1 | 8/2013 | Chang et al. |
| 2014/0076600 A1 | 3/2014 | Browning et al. |
| 2014/0209467 A1 | 7/2014 | Miao et al. |
| 2015/0090598 A1 | 4/2015 | Tatebe et al. |
| 2015/0176146 A1 | 6/2015 | Browning et al. |
| 2015/0225867 A1 | 8/2015 | Tatebe et al. |
| 2016/0024680 A1 | 1/2016 | Browning et al. |

FOREIGN PATENT DOCUMENTS

| | | |
|---|---|---|
| CN | 102834551 A | 12/2012 |
| CN | 103014706 A | 4/2013 |
| DE | 10134559 A1 | 2/2003 |
| EP | 993964 | 4/2000 |
| EP | 1110660 A2 | 6/2001 |
| EP | 2649224 A2 | 10/2013 |
| JP | 60-197897 | 7/1985 |
| JP | S62020898 A | 1/1987 |
| JP | S63179098 A | 7/1988 |
| JP | S63206499 A | 8/1988 |
| JP | 01-205094 | 8/1989 |
| JP | H06317921 A | 11/1994 |
| JP | H10121292 A | 5/1998 |
| JP | 2009221140 A | 10/2009 |
| JP | 2013084954 A | 5/2013 |
| KR | 1020080031966 A | 4/2008 |
| KR | 20080098331 A | 11/2008 |
| TW | 200524460 A | 7/2005 |
| TW | 200714747 A | 4/2007 |
| WO | 2011077899 A1 | 6/2011 |
| WO | WO2012076467 | 6/2012 |
| WO | WO2014130451 A1 | 8/2014 |
| WO | WO2014130452 A1 | 8/2014 |
| WO | WO2014130453 A1 | 8/2014 |

OTHER PUBLICATIONS

Masuda, "Highly ordered metal nanohole arrays based on anodized alumina", Solid State Physics, vol. 31, No. 5, Dec. 1996, pp. 493-499.
Search Report and Written Opinion from International Application No. PCT/US2013/047163 dated Sep. 25, 2013.
Taiwanese Patent Application No. 104120036—Office Action dated Feb. 15, 2016.
Korean Patent Application No. 10-2015-7001318—Notice of Preliminary Rejection dated Feb. 28, 2016.
Japanese Patent Application No. 2015-518627—First Office Action dated Feb. 29, 2016.
Chinese Application for Invention No. 201380032781.6—First Office Action dated Apr. 27, 2016.
Hashimoto et al., "Ag Nanoparticle Films for Color Applications, Sep. 2011,", Sep. 2011, Mater. Res. Symp. Proc., vol. 1343, pp. 1-6.
PCT/US2013/059793. Int'l Search Report—Written Opinion (dated Dec. 23, 2013).
Wang, et al. "Tuning color by pore depth of metal-coated porous alumina—" Nanotechnology, vol. 22, No. 30, Art. No. 305306, pp. 1-6 (2011).
Huang, et al. "Optical characteristics of pore size on porous anodic aluminum oxide films with embedded silver nanoparticles." Sensors & Actuators A: Physical, vol. 180, pp. 49-54. (Apr. 7, 2012).
Hu, et al. "Photosensitive gold-nanoparticle-embedded dielectric nanowires—" Nature Materials vol. 5, No. 2, pp. 102-106 {2006).
Li, et al., "Brilliant and tunable color by changing pore diameter of metal-coated porous anodic alumina." SPIE Proceedings, vol. 8564, pp. 85640-1-85640-6 {Nov. 20, 2012).
PCT/US14/051527. Int'l Search Report & Written Opinion (dated Nov. 24, 2014).
Sunada, et al. "Dielectric properties of Al—Si composite oxide films formed on electropolished and DC-etched aluminum by electrophoretic sol-gel coating and anodizing." J. Solid State Electrochem. vol. 11, No. 10:1375-1384 (Oct. 2007).
Chen et al, "The effect of anodizing voltage on the electrical properties of Al—Ti composite oxide film on aluminum." J. Electroanalytic Chem. vol. 590, No. 1:26-31 (May 2006).
Korean Patent Application No. 2015-7001318—First Office Action dated Sep. 26, 2016.
Chen et.al. Applied Surface Science. 256, 2010, 6518-6525.
Chinese Application Patent No. 201480059602.2—Office Action dated Mar. 24, 2017.
AlMawlawi, et.al. J. Appl. Phys., 70, 1991, 4421.
Regone et. al. J. Mat. Process. Tech., 172 (2006), 146-151.

(56) References Cited

OTHER PUBLICATIONS

Curran et. al. Surface and Coatings Technology, 199 (2005), 168-176.
European Patent Application No. 14857882.6—Extended European Search Report dated Jun. 21, 2017.
Vreeling et al., "Laser melt injection in aluminum alloys: on the role of the oxide skin", ACTA Materialia., vol. 48, No. 17, Nov. 2000 (Nov. 2000), pp. 4225-4233, 9 pages.
Korean Patent Application No. 10-2017-7017085—Office Action dated Jul. 20, 2017.
Japanese Patent Application No. 2016-153985—Office Action dated Sep. 29, 2017.

* cited by examiner

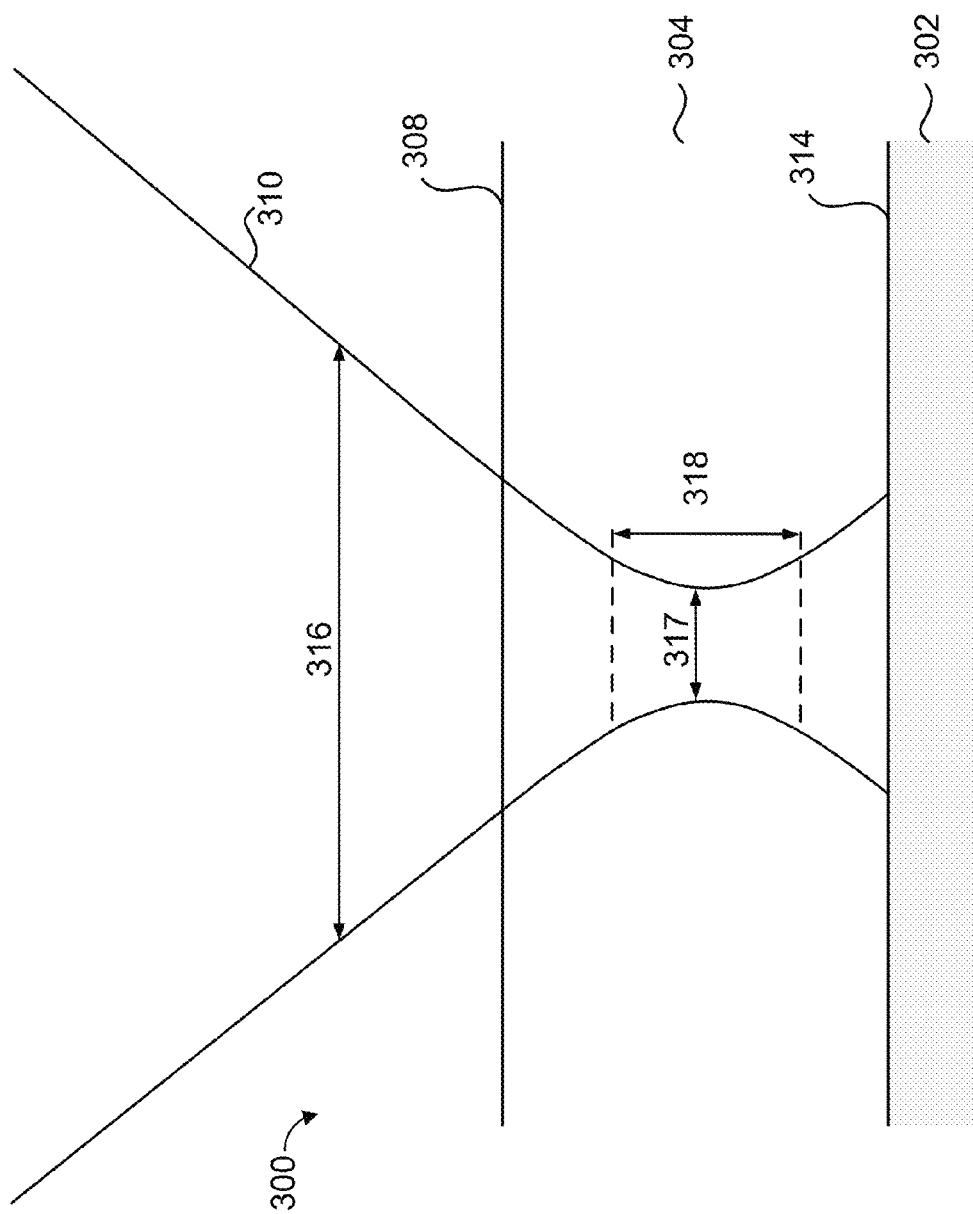

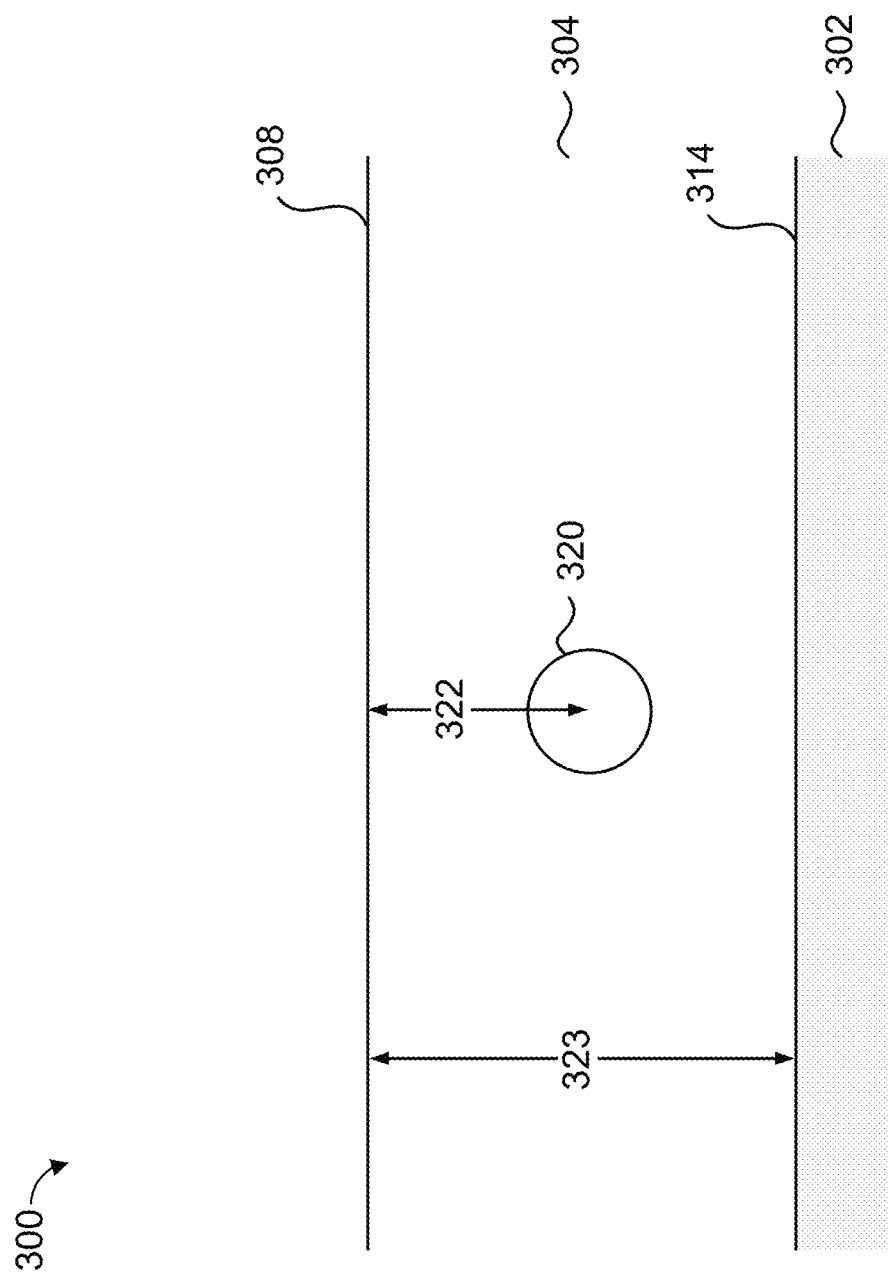

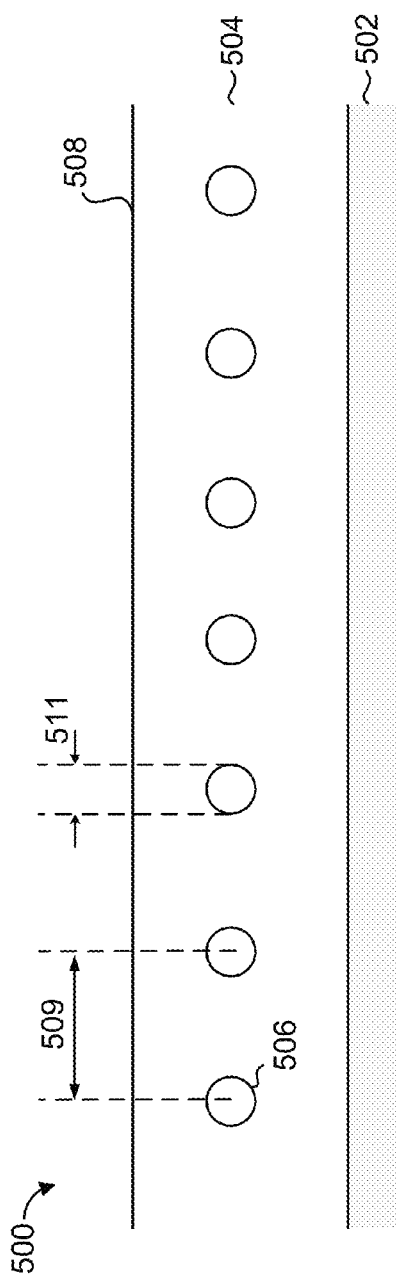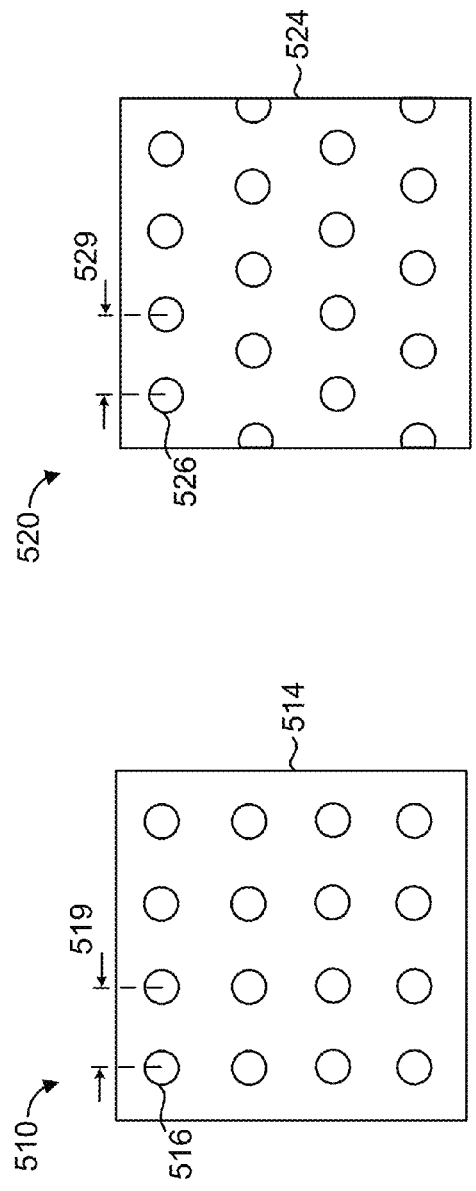

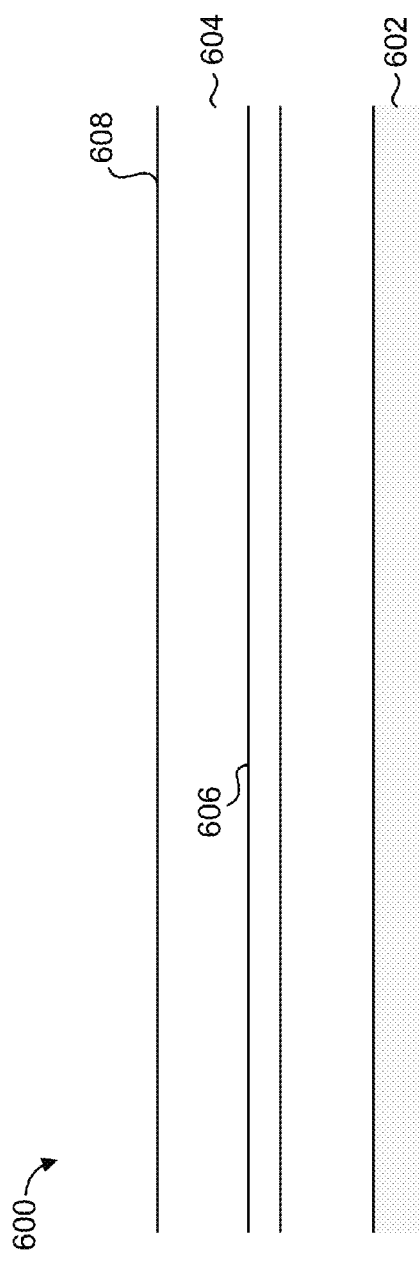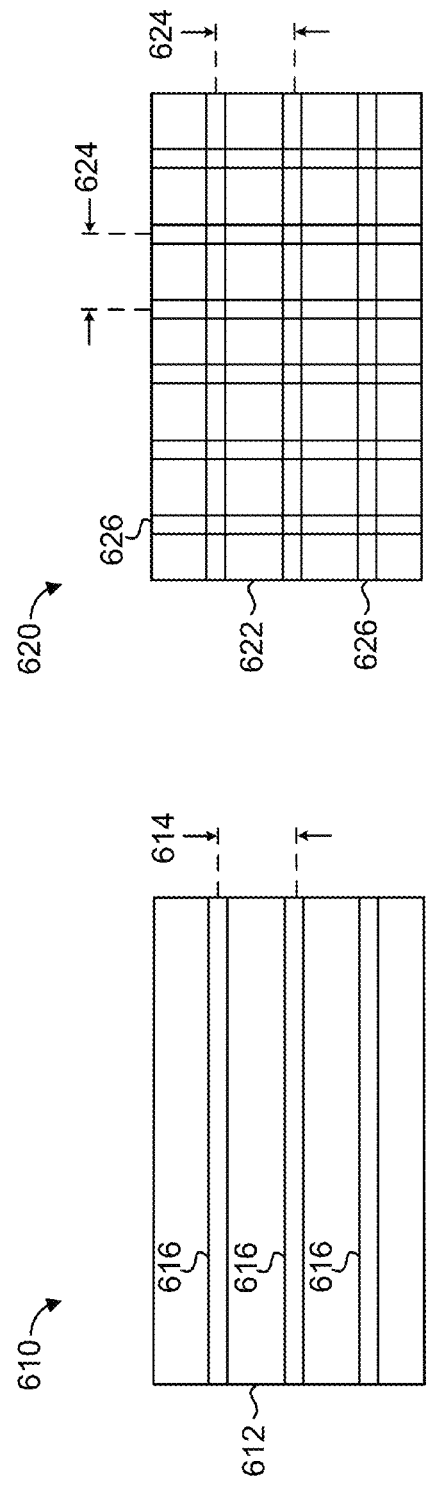

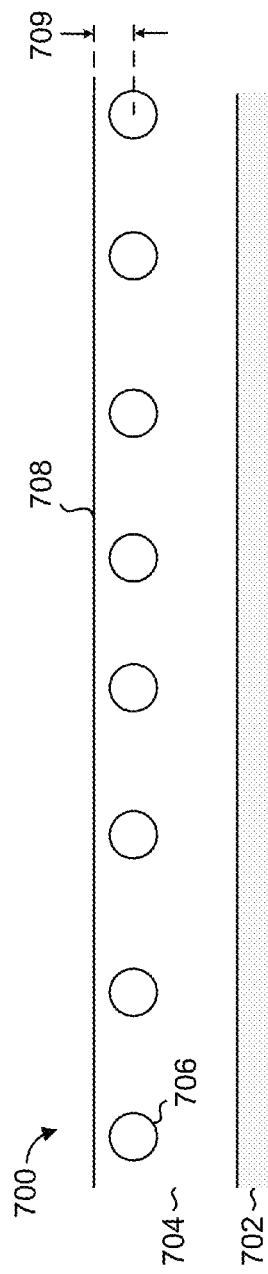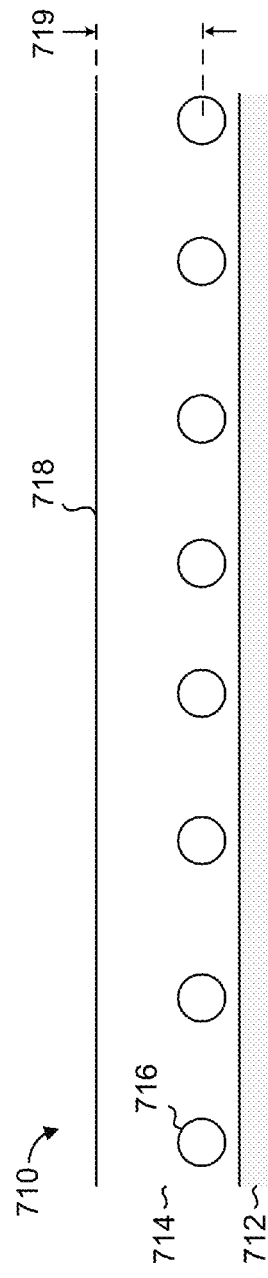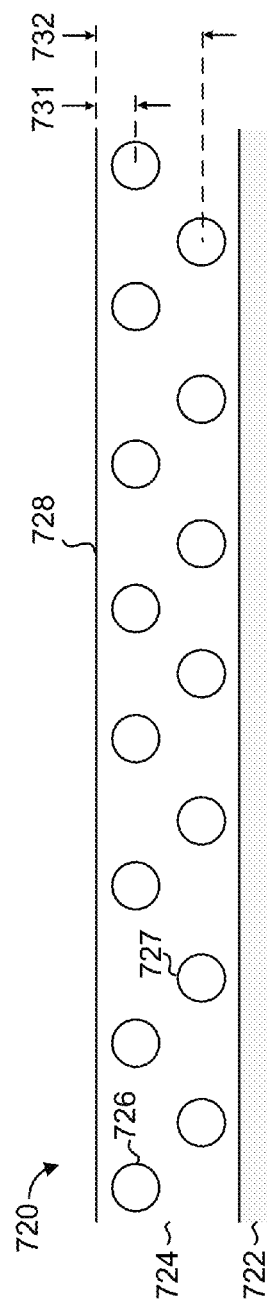

FORMING WHITE METAL OXIDE FILMS BY OXIDE STRUCTURE MODIFICATION OR SUBSURFACE CRACKING

CROSS-REFERENCE TO RELATED APPLICATION(S)

This application claims the benefit of priority under 35 U.S.C §119(e) to U.S. Provisional Application No. 61/903,890, filed on Nov. 13, 2013, the disclosure of which is incorporated herein by reference in its entirety.

FIELD

This disclosure relates generally to metal oxide films. More specifically, methods for producing white appearing metal oxide films using subsurface cracking techniques are disclosed.

BACKGROUND

Metal surfaces of many consumer products are often protected with a thin film of metal oxide. The metal oxide is generally harder than the underlying metal and thus provides a protective coating for the metal. Often, the metal oxide film is formed using an anodizing process. Anodizing is an electrolytic process that increases the thickness of a natural oxide layer on the surface of metal parts. The metal part to be treated forms an anode of an electrical circuit such that the surface of the metal part is converted to a metal oxide film, also referred to as an anodic film. The anodic film can also be used for a number of cosmetic effects. For example, techniques for colorizing anodic films have been developed that can provide an anodic film with a perceived color based. A particular color can be perceived when a light of a particular range of frequencies is reflected off the surface of the anodic film.

In some cases, it can be desirable to form an anodic film having a white color. However, conventional attempts to provide white appearing anodic films have resulted in anodized films that appear to be off-white, muted grey, and yellowish white instead of a crisp appearing white that many people find appealing.

SUMMARY

In one aspect, a method of modifying an appearance of an oxide film disposed on a substrate surface is described. The oxide film may be made of metal oxide material. The method may include forming at least one melted portion by heating the metal oxide material within a portion of the oxide film to a melting temperature of the metal oxide material. The method may further include creating several cracks within the oxide film by allowing the melted portion to cool and contract. Each of the several cracks is positioned substantially entirely beneath a top surface of the oxide film. The several cracks within the oxide film cause visible light incident a top surface of the oxide film to scatter imparting a white appearance to the oxide film.

In another aspect, a part is described. The part may include a metal substrate and a metal oxide layer. The metal substrate may include a substrate surface, the substrate surface having a mirror finish that specularly reflects substantially all visible light incident the substrate surface. The metal oxide layer disposed on the metal substrate, the metal oxide layer having a bottom surface adjacent the substrate surface and a top surface opposite the bottom surface. The metal oxide layer may include a first portion that is substantially translucent to visible light incident the top surface of the oxide layer such that at least a portion of visible light incident the top surface travels through the first portion and specularly reflects off the substrate surface. The metal oxide layer may also include a second portion having several cracks positioned beneath the top surface. Visible light incident the top surface of the oxide film diffusely reflects off the several cracks imparting a white quality to the second portion.

In another aspect, an enclosure for an electronic device is described. The enclosure may include a substrate and an oxide layer. The substrate may have several protrusions forming a first roughness. The oxide layer may be formed over the several protrusions. The oxide layer may include a first portion having several crystalline portions. A first light right ray reflected by the several crystalline structures forms a first appearance, and a second light ray absorbed by the several protrusions of a first roughness forms a second appearance. The second appearance may be different from the first appearance.

Other systems, methods, features and advantages of the embodiments will be, or will become, apparent to one of ordinary skill in the art upon examination of the following figures and detailed description. It is intended that all such additional systems, methods, features and advantages be included within this description and this summary, be within the scope of the embodiments, and be protected by the following claims.

BRIEF DESCRIPTION OF THE DRAWINGS

The disclosure will be readily understood by the following detailed description in conjunction with the accompanying drawings, wherein like reference numerals designate like structural elements, and in which:

FIGS. 3A-3C show cross section views of a portion of part that includes an oxide layer undergoing a laser melting procedure in accordance with described embodiments;

FIGS. 5A-5C show cross section and top views of different parts having oxide layers with different patterns of spots of crystalline metal oxide or cracks;

FIGS. 6A-6C show cross section and top views of different parts having oxide layers with different patterns of lines of crystalline metal oxide or cracks;

FIGS. 7A-7C show cross section views of different parts having oxide layers with spots of crystalline metal oxide or cracks positioned at different depths within the oxide layers;

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

This application relates to various methods and apparatuses used for treating a metal oxide film such that the metal oxide film appears white. In some embodiments, methods involve modifying at least a portion of the metal oxide film to a crystalline form metal oxide. In some embodiments, methods involve creating cracks or small gaps within the metal oxide film and beneath a top surface of the metal oxide film. In some embodiments, methods involve creating crystalline portions combined with creating cracks. The crystalline metal oxide or cracks within the metal oxide can interact with visible light incident the top surface of the film to give the metal oxide film a white appearance. The white appearing metal oxide films are well suited for providing protective and attractive surfaces to visible portions of consumer products. For example, methods described herein can be used for providing protective and cosmetically appealing exterior portions of metal enclosures and casings for electronic devices, such as those manufactured by Apple Inc., based in Cupertino, Calif.

As used herein, the terms oxide film, oxide layer, metal oxide film, and metal oxide layer may be used interchangeably and can refer to any appropriate metal oxide material. In some embodiments, the oxide film is formed using an anodizing process and can be referred to as an anodic film or anodic layer. The metal oxide films are formed on metal surfaces of a metal substrate. The metal substrate can include any of a number of suitable metals. In some embodiments, the metal substrate includes pure aluminum or aluminum alloy. In some embodiments, suitable aluminum alloys include 1000, 2000, 5000, 6000, and 7000 series aluminum alloys.

Figure 1A:
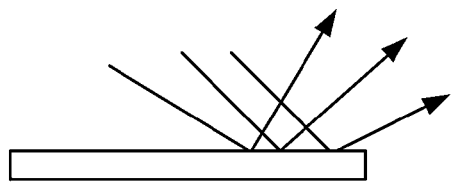
FIGS. 1A-1D illustrate various reflection mechanisms for providing a perceived color or quality of an object.
Figure 1B:
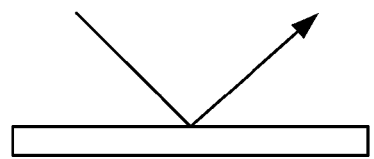
Figure 1C:
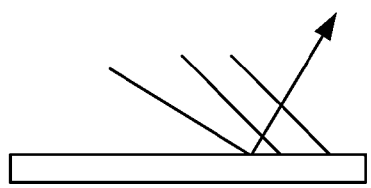
Figure 1D:
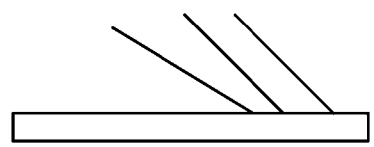

In general, white is the color of objects that diffusely reflect nearly all visible wavelengths of light. Thus, a metal oxide film can be perceived as white when nearly all visible wavelengths of light incident a top surface of the metal oxide film are diffusely reflected. FIG. 1A, shows how incident light can be diffusely reflected off a surface and scattered in many directions. Diffuse reflection can be caused by incident light reflecting off multi-faceted surfaces at a top surface or within an object. For example, facets of ice crystals that form a snowflake diffusely reflect incident light, rendering the snowflake white in appearance. This is in contrast to specular reflection (FIG. 1B) where light is reflected in one direction, colored objects (FIG. 1C) where some wavelengths of light are absorbed and only certain wavelengths of light are diffusely reflected, and black objects (FIG. 1D) where substantially all the wavelengths of light are absorbed and no light is reflected.

The amount of perceived whiteness of a metal oxide film can be measured using any of a number of color analysis techniques. For example a color opponent process scheme, such as an L,a,b (Lab) color space based in CIE color perception schemes, can be used to determine the perceived whiteness of different oxide film samples. The Lab color scheme can predict which spectral power distributions (power per unit area per wavelength) will be perceived as the same color. In a Lab color space model, L indicates the amount of lightness, and a and b indicate color-opponent dimensions. In some embodiments described herein, the white metal oxide films have L values ranging from about 85 to 100 and a,b values of nearly zero. Therefore, these metal oxide films are bright and color-neutral.

Figure 2A:
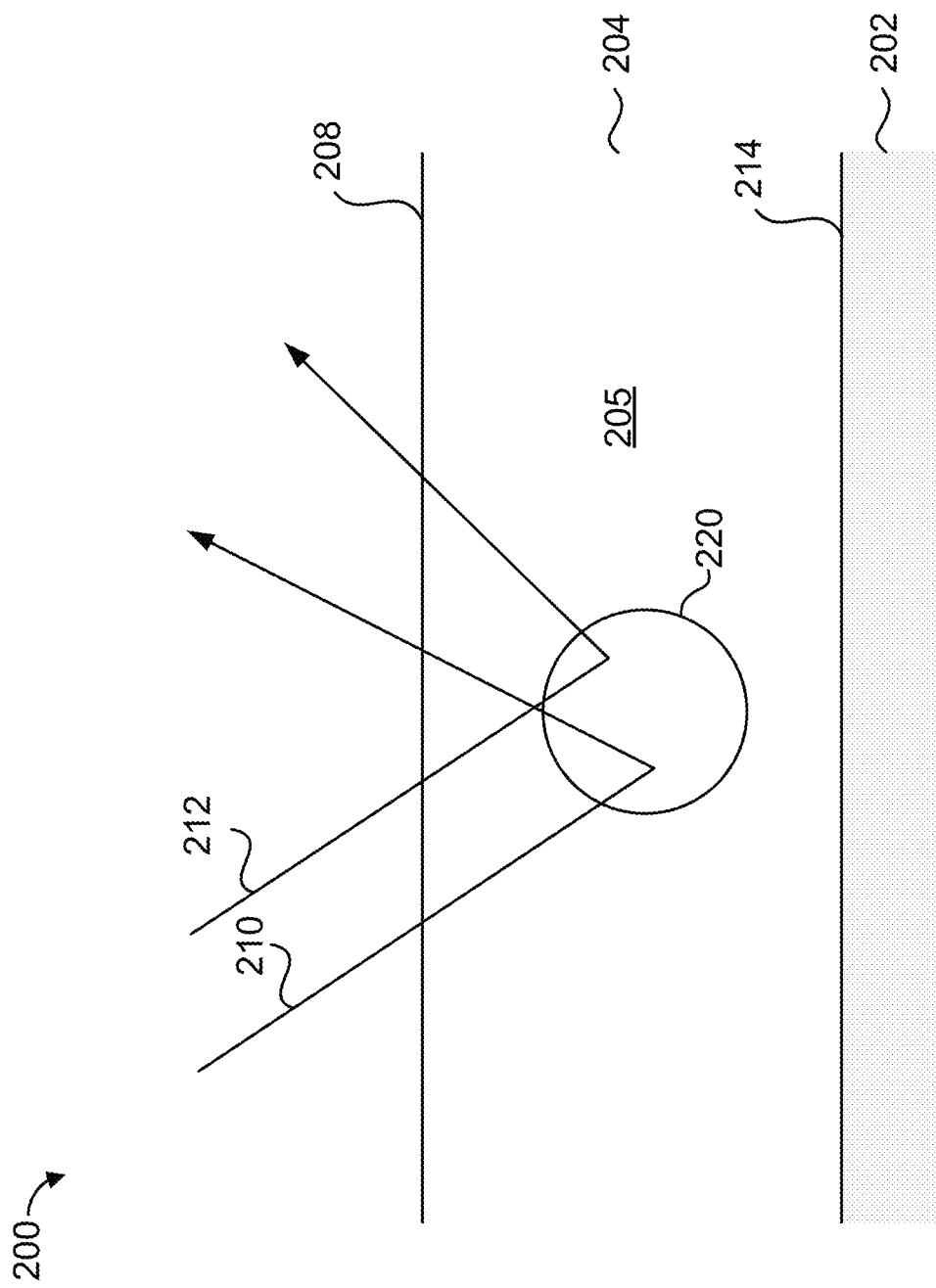
FIG. 2A shows a cross section of a portion of part that includes an oxide layer with crystalline metal oxide portions that diffusely reflect incident light and give the oxide layer a white appearance.

Some embodiments described herein involve forming crystalline portions of metal oxide within an oxide film such that incident light diffusely reflects off interfaces created by the crystalline portions, thereby imparting a white appearance to the oxide film. To illustrate, FIG. 2A shows a cross section of a portion of part 200, which includes substrate 202 and oxide layer (or oxide film) 204. Oxide layer 204 can be a glass-like amorphous metal oxide material 205 that is substantially translucent or transparent to visible light. Oxide layer 204 includes crystalline portion 220, which has a different structure than surrounding amorphous metal oxide material 205. Crystalline portion 220 includes multiple metal oxide crystals, each having light reflective facets. Incoming visible light can reflect off the crystalline facets at different angles, causing the light to scatter and diffusely reflect. For example, light ray 210 can enter oxide layer 204, reflect off of a first crystalline facet of crystalline portion 220 oriented at a first angle relative to top surface 208, and exit oxide layer 204. Light ray 212 can enter oxide layer 204, reflect off of a second crystalline facet of crystalline portion 220 oriented at a second angle different from the first angle relative to top surface 208, and exit oxide layer 204. In this way, multiple light rays entering oxide layer 204 can reflect off of crystalline portion 220 at multiple different angles, causing light to be diffusely reflected off of crystalline portion 220, thereby imparting a white appearance to oxide layer 204. In addition, the crystalline form of metal oxide within crystalline portion 220 will have a different refractive index compared to surrounding amorphous metal oxide material 205, which can cause further diffraction of light incident top surface 208 and contribute to the white appearance of oxide layer 204. Note that in some embodiments, substantially the entire oxide layer 204 is transformed to a crystalline form.

Figure 2B:
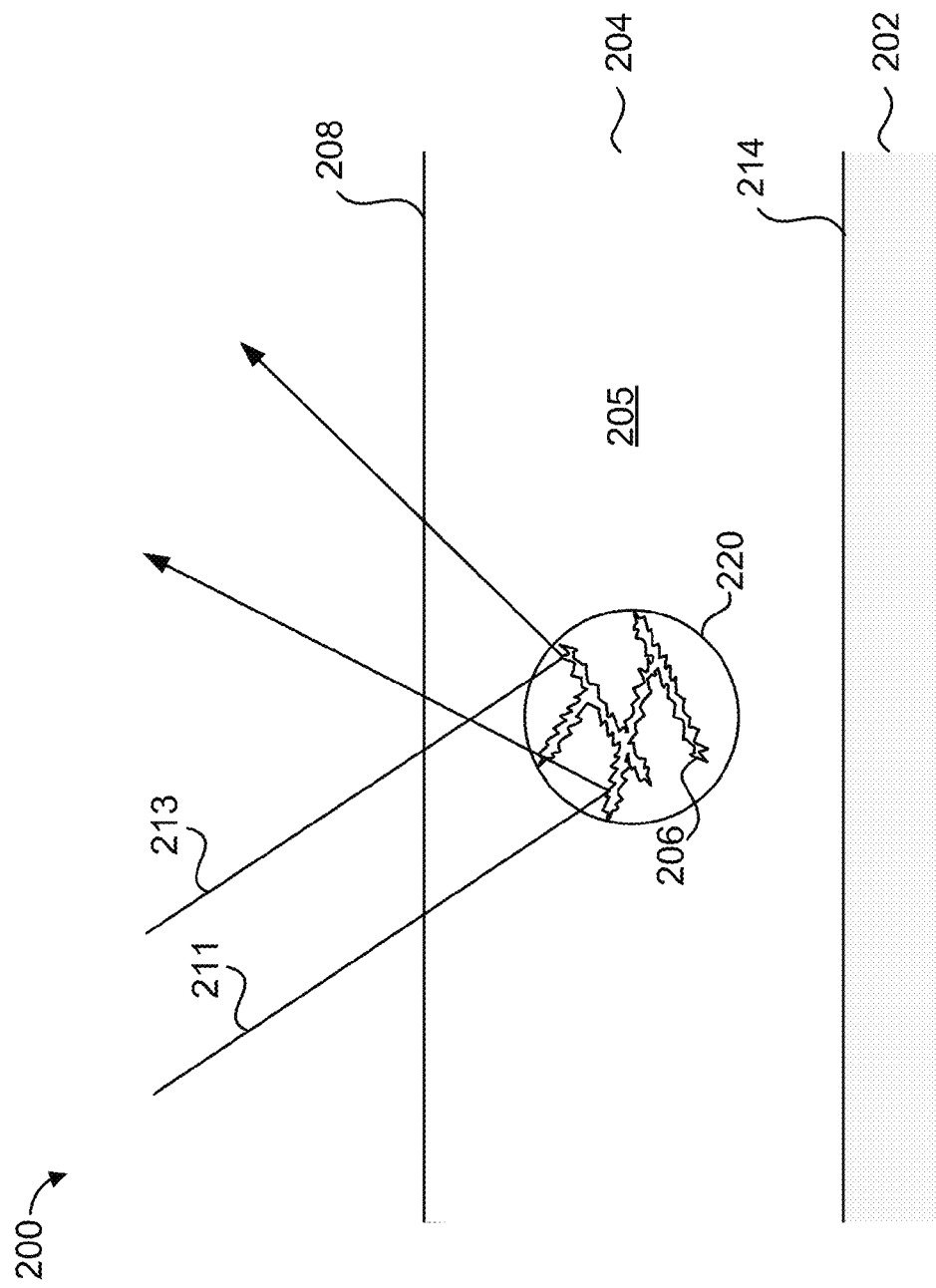
FIG. 2B shows a cross section of a portion of part that includes an oxide layer with cracks that diffusely reflect incident light and give the oxide layer a white appearance.

As shown in FIG. 2B, in some embodiments, crystalline portion 220 has cracks 206 formed therein such that incident light diffusely reflects off of interfaces of the cracks, thereby contributing a white appearance to the oxide film. In some embodiments, cracks 206 are formed without formation of crystalline portion 220. Cracks 206 are breaks in the metal oxide material of oxide layer 204. Cracks 206 have surfaces that are irregularly oriented within oxide layer 204. Incoming visible light can reflect off the irregularly oriented surfaces at different angles, causing the light to diffusely reflect off of cracks 206. For example, light ray 211 can enter oxide layer 204, reflect off of a first surface of cracks 206 oriented at a first angle relative to top surface 208, and exit oxide layer 204. Light ray 213 can enter oxide layer 204, reflect off of a second surface of cracks 206 oriented at a second angle different from the first angle relative to top surface 208, and exit oxide layer 204. In this way, multiple light rays entering oxide layer 204 can reflect off of cracks 206 at multiple different angles, causing light to be diffusely reflected off of cracks 206, thereby imparting a white appearance to oxide layer 204.

Crystalline portion 220 and cracks 206 can have any suitable shape and size. As described above, crystalline portion 220 can include a portion or make up substantially the entire metal oxide material of oxide layer 204. If substantially the entire metal oxide material of oxide layer 204 is in a crystalline form, cracks 206 can be formed throughout oxide layer 204. Note that the size of cracks 206 are generally smaller than as depicted in FIG. 2B with respect to an overall thickness of oxide layer 204. In some embodiments, individual features of cracks 206 are substantially non-visible to an observer, but rather give at least a portion of oxide layer 204 a generally white appearance. In some embodiments, the lengths of cracks 206 are on the scale of micrometers (microns) or longer. In some embodiments, cracks 206 are on the scale of between about 0.5 and 30 microns in length. In some embodiments, cracks 206 form air-filled voids within oxide layer 204. The air within the voids has a different refractive index than the surrounding metal oxide material, which can cause further diffraction of light. Note that cracks 206 can have any suitable shape. In some embodiments, cracks 206 are elongated, as shown in FIG. 2B. In some embodiments, the cracks are circular, elliptical (spherical or ellipsoidal) or pore-like in shape. Crystalline portion 220 or cracks 206 can be in any suitable location within oxide layer 204. In some embodiments, substantially the entirety of crystalline portion 220 or cracks 206 is positioned beneath top surface 208 of oxide film 204. Forming cracks 206 subsurface of top surface may be used in applications wherein it is undesirable for top surface 208 to have cracks. For instance, in some applications it may be desirable to have a continuous and uninterrupted top surface 208. In some embodiments, top surface 208 is smooth, shiny and specularly reflective.

Figure 3C:
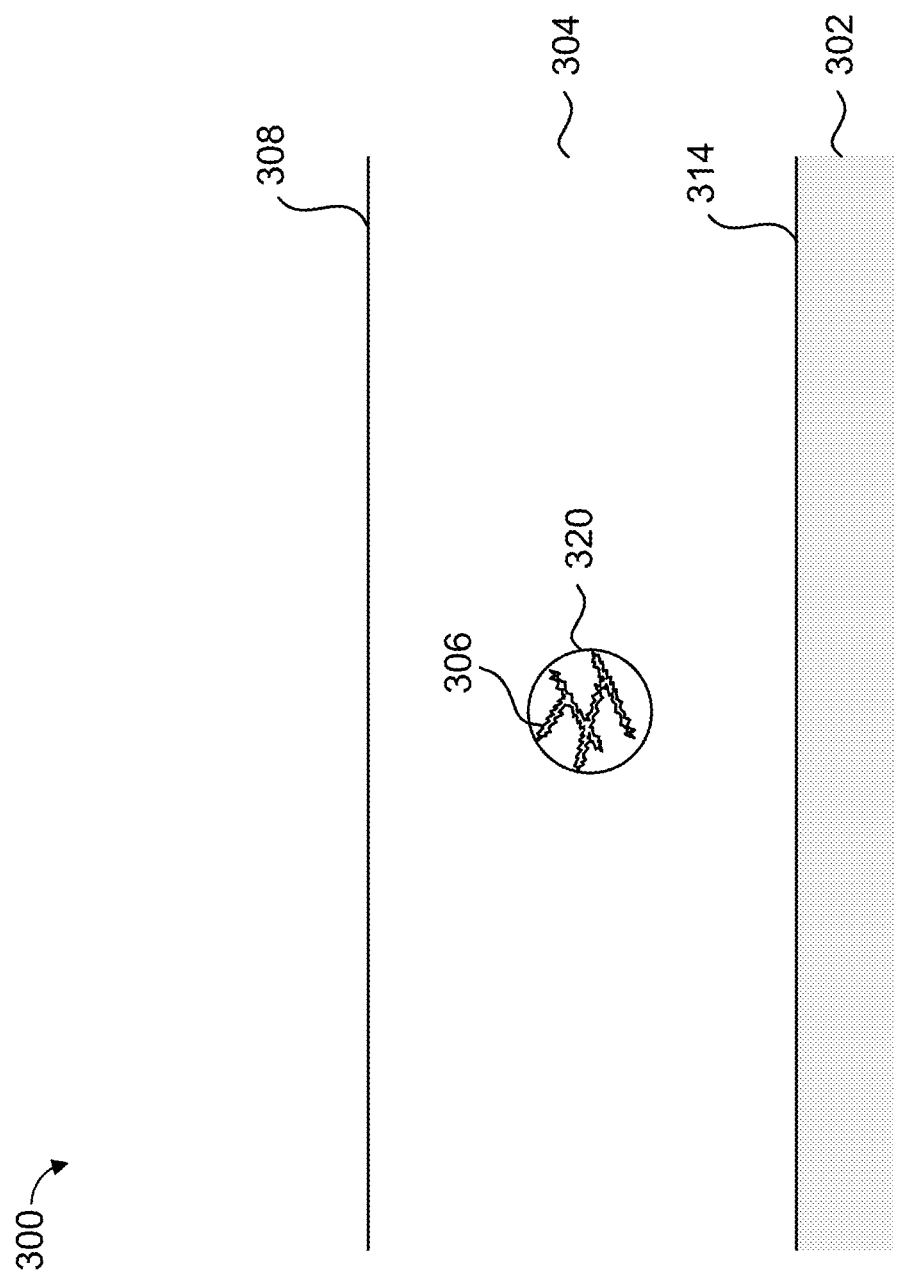

Crystalline portion 220 or cracks 206 can be formed using any suitable procedure. In some embodiments, crystalline portion 220 or cracks 206 are formed using a laser procedure. In some embodiments, crystalline portion 220 and cracks 206 are formed using other heating processes such as a plasma process. In some embodiments, the laser is tuned to form crystalline portion 220 or cracks 206 within oxide layer 204 between the top surface 214 of substrate 202 and top surface 208 of oxide layer 204. This can be accomplished by directing a laser beam at oxide layer 204 such that energy from the laser beam is focused on local areas within oxide layer 204. The energy causes the metal oxide material in the local areas to melt. As the melted oxide material cools, it can re-solidify in a crystalline form. In some embodiments, the cooling process can form cracks 206. To illustrate, FIGS. 3A-3C show cross section views of a portion of part 300, which includes oxide layer 304 integrally formed on substrate 302, undergoing a laser procedure in accordance with described embodiments.

At 3A, laser beam 310 is directed at top surface 308 of oxide layer 304. Laser beam 310 is tuned to generate enough heat to melt localized portions of the metal oxide material of oxide layer 304. In some embodiments, laser beam 310 is scanned over substantially the entire top surface 308 of oxide layer 304 to melt substantially all of oxide layer 304. Laser beam 310 parameters such as wavelength, spatial energy distribution (e.g., spot size and beam shape), and temporal energy distribution (e.g., pulse duration and pulse separation) can be adjusted to cause a sufficient amount of energy to heat and melt the metal oxide but not so high an energy to negatively impact the structural integrity of oxide layer 304 too much. In some embodiments, the metal oxide material within oxide layer 304 is heated to a temperature of about 600 degrees C. or greater. In some embodiments, the metal oxide material within oxide layer 304 is heated to a temperature ranging between about 600 and 1200 degrees C. In some embodiments, the wavelength of laser beam 310 ranges within the infrared spectrum of light. In some embodiments, a CO2 laser is used, which produces infrared laser light having principle wavelength bands centering around 9.4 and 10.6 micrometers.

Laser beam 310 is tuned such that depth of focus (DOF) 318 is positioned within oxide layer 304 between top surface 308 of oxide layer 304 and top surface 314 of substrate 302. In some embodiments, spot size of laser beam 310 is small enough to melt localized portions within oxide layer 304 without substantially affecting surrounding portions of metal oxide material. In general, a smaller spot size corresponds to a smaller beam waist 317, a larger beam width 316, a smaller DOF 318, and a higher energy density (e.g., Joules/cm2). In some embodiments, the spot size and DOF 318 are each less than about 10 micrometers. In some embodiments, the spot size and DOF 318 each range from about one micrometer and about 10 micrometers. It should be noted that the spot size and DOF 318 used in the applications described herein for melting localized portions within a metal oxide film are generally small compared to traditional laser ablating and marking procedures. For example, typical laser marking applications use a spot size in the range of about 20 micrometers and 100 micrometers and a DOF 318 in the range of about 100 micrometers to about 200 micrometers. In addition, the beam width 316 used in the applications described herein are generally large compared to traditional laser ablating and marking procedures. In some embodiments, the shape of laser beam 310 is adjusted to optimize the effect of laser beam 310 on oxide layer 304. For example, a Gaussian beam shape (as shown in FIG. 3A) can have a different effect on the metal oxide material within oxide layer 304 compared to a flat top beam shape.

FIG. 3B shows spot 320, which corresponds to the area within oxide layer 304 that is melted by an impinging laser beam. The diameter of spot 320 can vary depending on laser parameters, such as those described above, as well as the nature of the metal oxide material of oxide layer 304. In some embodiments, spot 320 has a diameter ranging from about 1 micrometer and about 5 micrometers. In some embodiments, spot 320 has a diameter ranging from about 2 micrometers and about 5 micrometers. The depth 322 of spot 320 relative to top surface 308 of oxide layer 304 can be adjusted using a number of methods. In some embodiments, an additional laser system is used to measure thickness 323 of oxide layer 304 prior to the laser cracking procedure. The measurement of thickness 323 can then be used to adjust laser parameters of the laser used to perform the laser procedure such that spot 320 is positioned within a depth 322 that is predetermined within oxide layer 304. In some embodiments, top surface 308 is substantially planar such that depth 322 is substantially constant throughout the area of top surface 308. As the laser beam is directed at oxide layer 304, the energy of the laser beam generates localized heat within spot 320 of oxide layer 304 sufficient to at least reach the glass transition temperature of the metal oxide material within spot 320. Accordingly, at least a portion of the metal oxide material within spot 320 melts. In some embodiments, as heat generated by the laser beam dissipates and the metal oxide material within spot 320 cools, the metal oxide material transitions to a crystalline form. In some embodiments, the amorphous form of metal oxide material is a hydroxide or hydrated form of aluminum oxide, such as boehmite. The heat from the laser beam can drive off water from the hydroxide or hydrated form of the aluminum oxide, leaving a crystalline form of aluminum oxide (i.e., alumina). As described above, light incident top surface 308 of oxide layer 304 can diffusely reflect off of the crystalline facets within spot 320 and give oxide layer 304 a white appearance.

FIG. 3C shows spot 320 having cracks 306 formed therein. In some embodiments, during the cooling of metal oxide material within spot 320, the metal oxide material contracts forming cracks 306. The size of cracks 306 can vary depending upon a number of parameters including laser energy parameters, cooling time, and type of oxide layer 304. In some embodiments, cracks 306 are on the scale of between about 0.5 and 30 microns in length. As described above, light incident top surface 308 of oxide layer 304 can diffusely reflect off of the irregular surfaces of cracks 306 and give oxide layer 304 a white appearance.

Figure 4A:
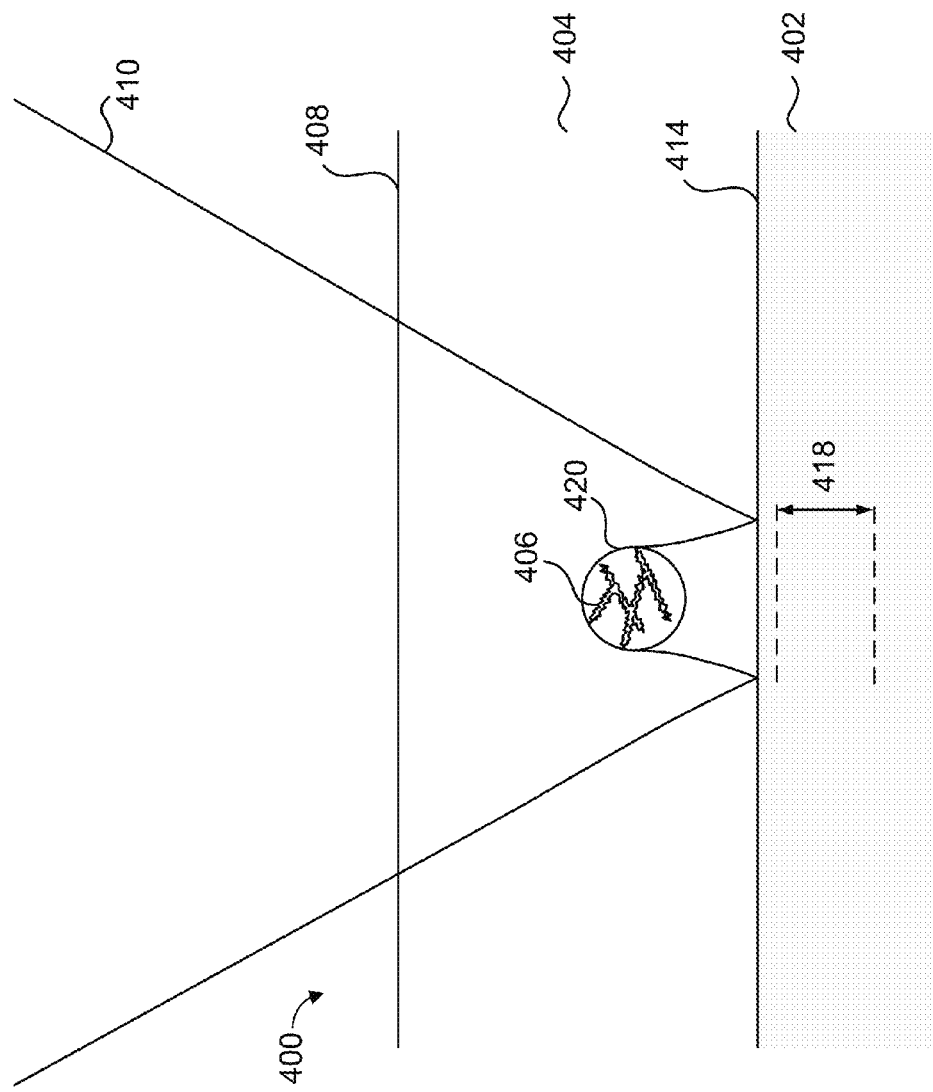
FIGS. 4A and 4B show cross section views of different parts undergoing different types of laser melting procedures in accordance with described embodiments.

As described above, in some embodiments, oxide layer 304 can be formed using any suitable method. In some embodiments, methods such as plasma electrolytic oxidation are used to form oxide layer 304 that is in largely crystalline form. In some embodiments, an anodizing process is used to form oxide layer 304 that is in largely amorphous form. In some embodiments, the laser is tuned to reflect off of the top surface of an underlying substrate and back onto the oxide layer to cause melting within the oxide layer. To illustrate, FIG. 4A shows a cross section view of a portion of part 400, which includes oxide layer 404 positioned on substrate 402. Laser beam 410 is tuned such that the depth of focus 418 of laser beam 410 is positioned below oxide layer 404, i.e., below top surface 414 of substrate 402. Laser beam 410 then reflects off of top surface 414 of substrate 402 and becomes focused at spot 420 within oxide layer 404, thereby causing spot 420 of crystalline metal oxide or cracks 406 to form. As with the embodiments described above with reference to FIGS. 3A-3C, the crystalline metal oxide and/or cracks 406 within spot 420 can cause light incident top surface 408 to diffusely reflect off of the surfaces of the crystalline metal oxide or cracks 406 and give oxide layer 404 a white appearance.

Figure 4B:
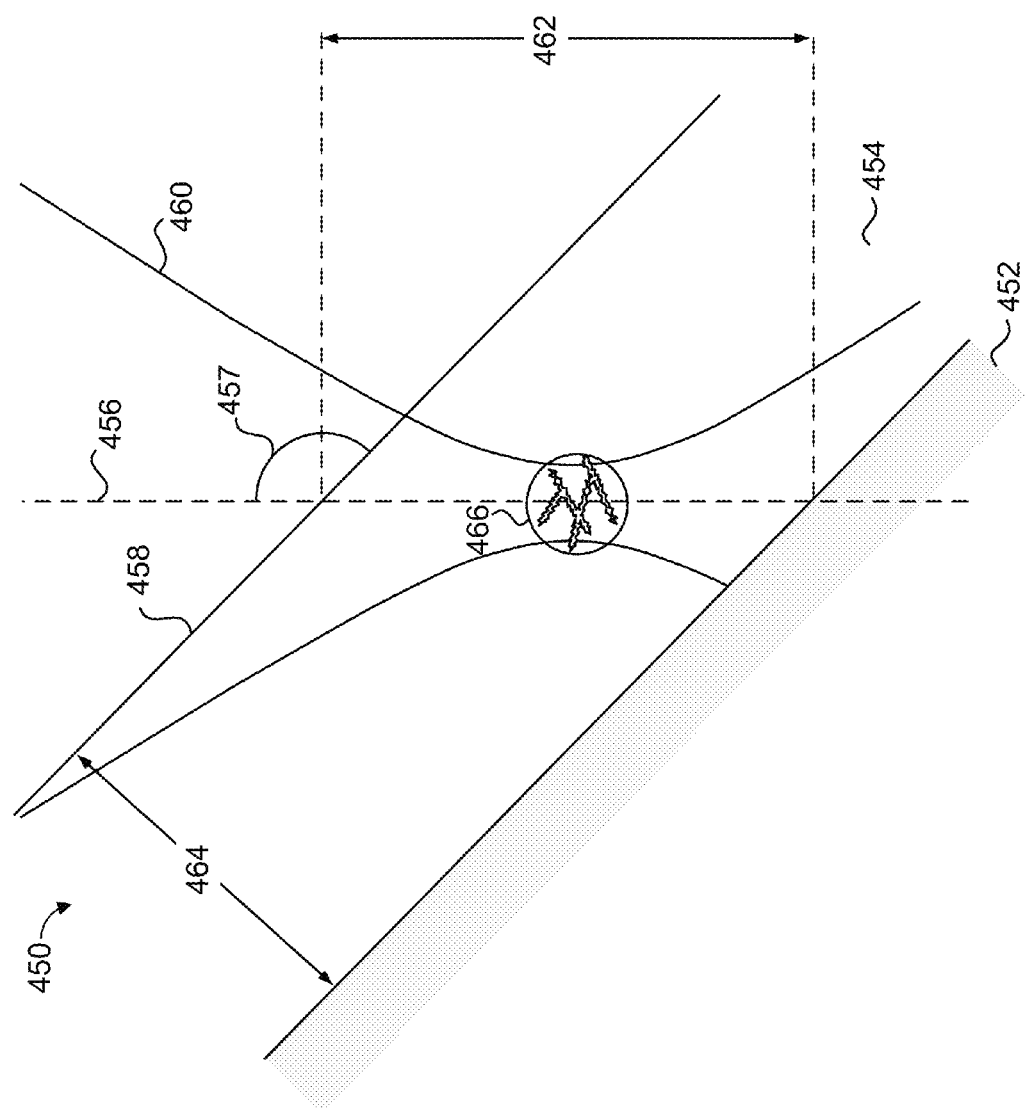

In some embodiments, the laser beam is directed at an oxide layer at a non-normal angle relative to a top surface of the oxide layer. FIG. 4B shows a cross section view of a portion of part 450, which includes oxide layer 454 positioned on substrate 452. As shown, part 450 is skewed relative to beam path 456 of laser beam 460. That is, top surface 458 of part 450 is positioned at a non-perpendicular angle 457 relative to beam path 456. One advantage of using such a skewed configuration is that laser beam 460 can impinge upon a greater effective thickness 462 of oxide layer 454 compared to the actual thickness 464 of oxide layer 454. In some embodiments, this allows for greater control over the depth of spot 466 within oxide layer 454.

An amount of whiteness of an oxide film can be adjusted by choosing an amount of spots of crystalline metal oxide material or cracks within the oxide film, the spatial distances between the spots within the oxide film, and the depth of the spots within the oxide film. The spots can be formed in patterns within an oxide films. In some embodiments, the spots are formed in clusters within spots as described above with reference to FIGS. 3 and 4. In other embodiments, the cracks are formed in substantially continuous lines. FIGS. 5-7 show cross section and top views of different parts having different amounts of spots, different patterns of spots, and spots that are positioned in different locations within oxide films.

FIG. 5A shows a cross section view of part 500, which includes oxide layer 504 disposed on substrate 502. Oxide layer 504 includes spots 506, which correspond to crystalline metal oxide portions or clusters of cracks created by a laser operation as described above. Spots 506 are positioned an average distance 509 from each other, sometimes referred to as pitch. Pitch 509 can be chosen such that the overall appearance of oxide layer 504 is white as viewed from top surface 508. In some embodiments, the pitch is about twice the diameter 511 of spots 506. In some embodiments, pitch 509 ranges from about 1 micrometer and about 10 micrometers. In some embodiments, spots 506 are spaced equidistantly from each other while in other embodiments spots 506 are spaced at substantially random distances from each other. The whiteness of oxide layer 504 can be chosen by adjusting pitch 509, with smaller pitches corresponding with whiter appearing oxide layers. Spots 506 can be formed using a pulsed laser beam or a continuous laser beam. For example, each spot 506 can correspond to a pulse of a pulsed laser beam, which is scanned over top surface 508. The laser beam can pulsed one or more time at each of spots 506. If a continuous laser beam is used, the laser beam can be positioned over each of spots 506 for a predetermined time period and moved quickly over distances between each of spots 506. Alternatively, mirrors can be used to position a continuous laser beam at locations corresponding to each spot 506.

FIGS. 5B and 5C show top views of different parts 510 and 520, respectively, having different patterns of spots of crystalline metal oxide portions or clusters of cracks. FIG. 5B shows a top view of part 510 having equidistant spots 516 within oxide layer 514 that are spaced an average distance 519 apart from each other. Pitch 519 can be adjusted in accordance with an amount of whiteness desired, with a smaller pitch 519 corresponding to whiter appearing oxide layer 514. FIG. 5C shows a top view of part 520 having equidistant spots 526 within oxide layer 524 that are arranged in a staggered configuration spaced an average distance 529 apart from each other. Distance 529 can be adjusted in accordance with an amount of whiteness desired, with smaller distances 529 corresponding to whiter appearing oxide layer 524. Note that the patterns of spots shown in FIGS. 5A-5C are merely exemplary and that any suitable pattern of spots can be formed within an oxide layer. For example, in other embodiments, the spots are spaced a substantially random distances from each other.

FIG. 6A shows part 600, which includes oxide layer 604 disposed on substrate 602. Oxide layer 604 has a substantially continuous line 606 that includes a continuous crystalline metal oxide portions or continuous line of cracks. Line 606 can be formed using a continuous laser beam or a pulsed laser beam. For example, a continuous laser beam can be continuously scanned across top surface 608 to form continuous line 606. A pulsed laser beam can be scanned incrementally over top surface 608 forming a substantially continuous line 606. FIGS. 6B and 6C show top views of parts 610 and 620, respectively, having different patterns of lines of crystalline metal oxide portions or cracks. FIG. 6B shows a top view of part 610 having equidistant parallel lines 616 within oxide layer 612. Adjacent lines 626 may be equidistant with respect to each other. Lines 616 are spaced an average distance 614 apart from each other. Distance 614 can be chosen such that the overall appearance of oxide layer 612 is white as viewed from a top surface of oxide layer 612. Distance 614 can be adjusted in accordance with an amount of whiteness desired, with smaller distances 614 corresponding to whiter appearing oxide layer 612.

FIG. 6C shows a top view of part 620 having equidistant lines 626 of crystalline metal oxide portions or cracks that are arranged in a crosshatched pattern. Lines 626 are spaced an average distance 624 apart from each other, with some of the lines 626 arranged in a parallel orientation with respect to each other and other lines 626 arranged in a perpendicular orientation with respect to each other, thereby forming the crosshatched pattern. Distance 624 can be chosen such that the overall appearance of oxide layer 622 is white as viewed from a top surface of oxide layer 622. Distance 624 can be adjusted in accordance with an amount of whiteness desired, with smaller distances 624 corresponding to whiter appearing oxide layer 622. Note that the patterns of lines of crystalline metal oxide portions or cracks shown in FIGS. 6A-6C are merely exemplary and that any suitable pattern of lines can be formed within an oxide layer. For example, in other embodiments, the lines are spaced at substantially random distances from each other.

The crystalline metal oxide portions or cracks can be positioned at any suitable depth within an oxide layer. To illustrate, FIGS. 7A-7C show cross section views of different parts 700, 710, and 720, respectively, which have spots of crystalline metal oxide portions or cracks at different depths within oxide layers. FIG. 7A shows a cross section view of part 700 having spots 706 within oxide layer 704, which is positioned over substrate 702. Spots 706 are situated an average distance or depth 709 from top surface 708 of oxide layer 704. Depth 709 can be adjusted in accordance with an amount of whiteness desired of oxide layer 704. In some embodiments, the smaller depths 709 correspond to a whiter appearing oxide layer 704. FIG. 7B shows a cross section view of part 710 having spots 716 of crystalline metal oxide portions or cracks within oxide layer 714, which is positioned over substrate 712. Spots 716 are situated an average depth 719 as measured from top surface 718 of oxide layer 704. As shown, spots 716 are positioned at a farther depth within oxide layer 714 with respect to top surface 718 compared to spots 706 of part 700. In some embodiments, the larger average depth 719 will result in oxide layer 714 of part 710 having a less white appearance compared to oxide layer 704 of part 700. This can be due to different observer viewing angles of spots 706 and spots 716 as viewed from top surfaces 708 and 718, respectively.

FIG. 7C shows a cross section view of part 720 having a first layer of spots 726 of crystalline metal oxide portions or cracks and a second layer of spots 727 of crystalline metal oxide portions or cracks within oxide layer 724, which is positioned over substrate 722. First layer of spots 726 are situated an average depth 731 from top surface 728 of oxide layer 724. Second layer of spots 727 are situated an average depth 732, larger than average depth 731, from top surface 728 of oxide layer 724. In some embodiments, oxide layer 724 of part 720 will have a larger amount of crystalline metal oxide portions or cracks and appear whiter than each of oxide layer 714 of part 710 and oxide layer 704 of part 700. First layer of spots 726 can be arranged in a staggered or parallel orientation with respect to second layer of spots 727. Note that the depth of the spots of crystalline metal oxide portions or cracks shown in FIGS. 7A-7C are merely exemplary and that any suitable depth and number of layers of spots can be formed within an oxide layer. For example, in other embodiments, three or more layers of spots are formed within an oxide layer.

Figure 8:
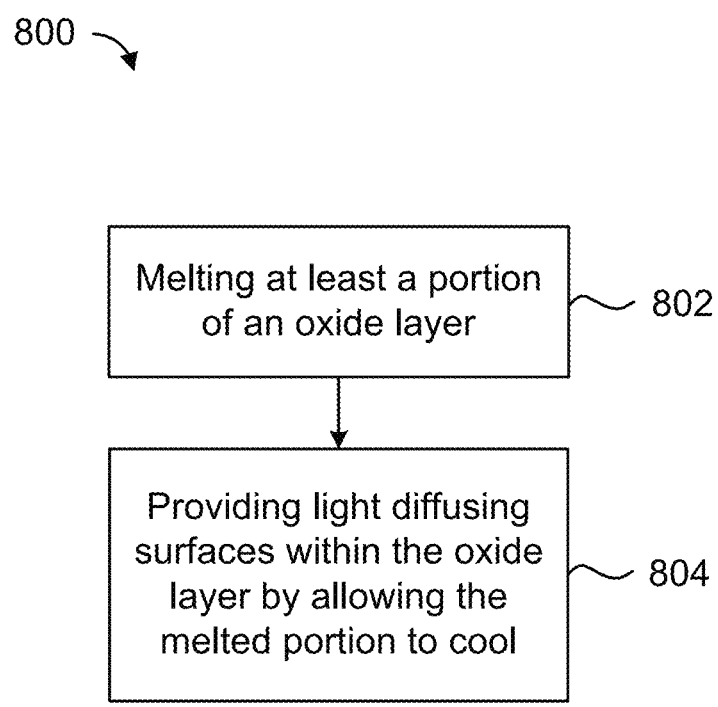
FIG. 8 shows a flowchart indicating a method for forming a white oxide layer using a melting process in accordance with described embodiments.

FIG. 8 shows flowchart 800 indicating a method for forming a white oxide layer using melting processes in accordance with described embodiments. At 802, at least a portion of an oxide layer is melted. The oxide layer can be formed using any suitable technique and can have any suitable microstructure. In some embodiments, the oxide layer is formed using an anodizing process to form a largely amorphous metal oxide structure. The oxide layer can be formed at any suitable thickness. In some embodiments, the oxide layer has a thickness ranging from about 5 micrometers and about 60 micrometers. In some embodiments, the oxide layer has a thickness ranging from about 10 micrometers and about 30 micrometers. In some embodiments, the oxide layer is planarized in order to form a uniform top surface to the oxide layer. The melting can be performing using any suitable process. In some embodiments, the melting occurs by directing a laser beam at the oxide layer such that a localized portion of the oxide layer is heated at a temperature sufficient to reach a melting temperature of the metal oxide material.

At 804, the at least one melted portion of the oxide layer is allowed to cool, thereby forming light diffusing surfaces within the oxide layer. In some embodiments, the cooling process causes the metal oxide material to re-solidify in crystalline form. In some embodiments, the cooling process causes the metal oxide material to crack. In some embodiments, the cooling process forms both crystalline metal oxide and forms cracks. The crystalline metal oxide and/or cracks have surfaces that can cause light incident on the top surface of the oxide layer to diffusely reflect, imparting a white appearance to the oxide layer. In some embodiments, the crystalline metal oxide or cracks are formed beneath the top surface of the oxide layer, thereby leaving a continuous, un-affected and un-cracked top surface. The crystalline metal oxide portions or cracks can be formed in any suitable pattern within the oxide layer and at any suitable depth within the oxide layer. In some embodiments, the depth and pattern of crystalline metal oxide portions or cracks is chosen to achieve a predetermined whiteness of the oxide layer.

Figure 9A:
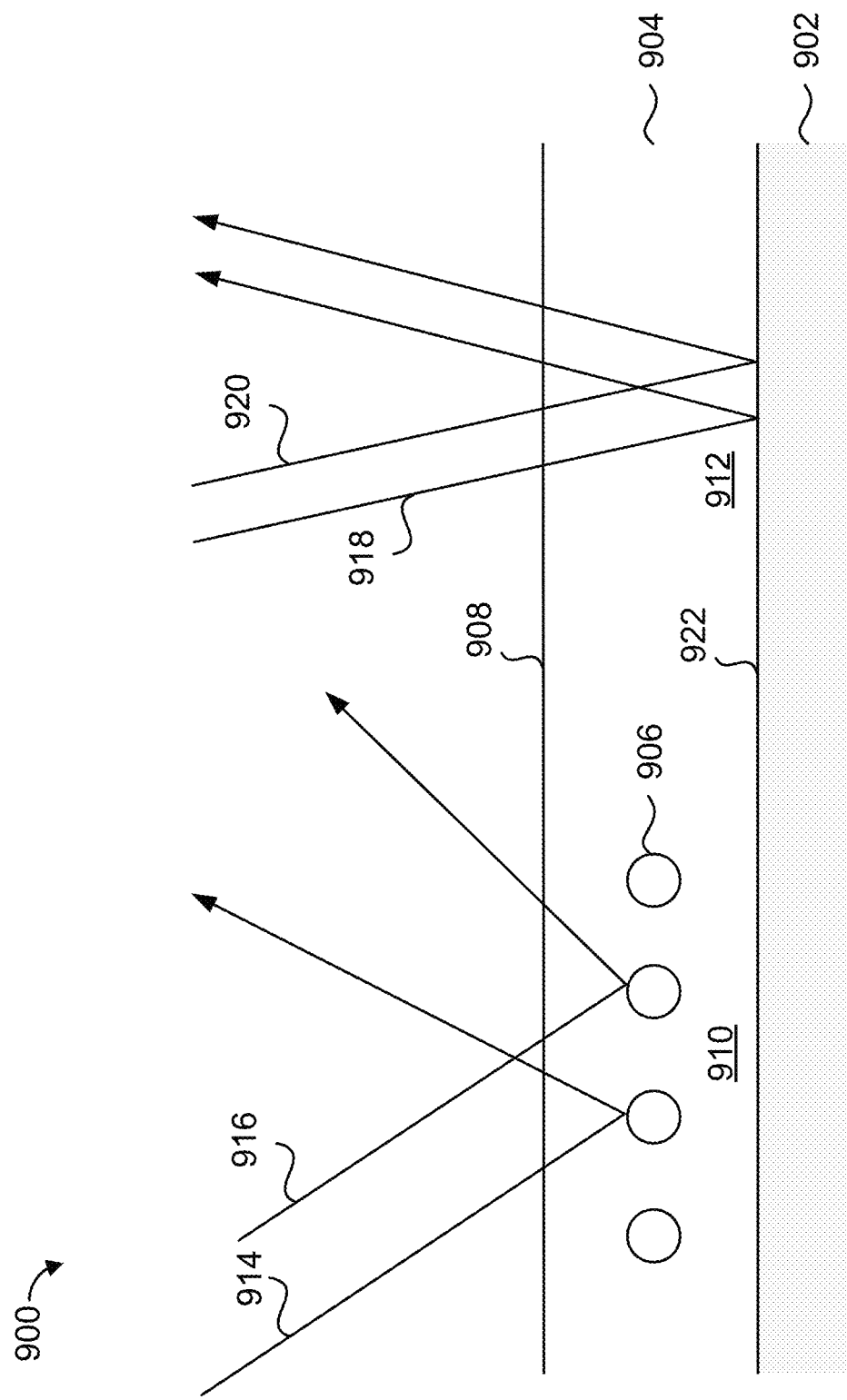
FIG. 9A shows a cross section view of a part with a first portion that diffusely reflects incident light and a second portion that specularly reflects light.

As described above, specular reflection involves reflection of light in one direction. Objects that specularly reflect light will have a mirror-like quality. In contrast, diffuse reflection involves scattering of light resulting in objects appearing white. In some applications, it can be desirable for an oxide film to both diffusely and specularly reflect visible light, resulting in a white and bright appearance. The relative amount of diffuse reflection and specular reflection can be adjusted to accomplish a particular white and bright appearance. To illustrate, FIG. 9A shows a cross section view of part 900, which includes oxide layer 904 positioned on substrate 902. Oxide layer 904 includes first portion 910 and second portion 912. First portion 910 has spots 906 of crystalline metal oxide or cracks that diffusely reflect incoming visible light. For instance, light ray 914 entering top surface 908 of oxide layer 904 reflects off spots 906 and exits top surface 908 at a first angle. Light ray 916 entering top surface 908 of oxide layer 904 reflects off spots 906 and exits top surface 908 at a second angle that is different than the first angle. In this way, spots 906 diffusely reflect light incident top surface 908 and impart a white appearance to first portion 910 of oxide layer 904.

Second portion 912 does not substantially include any spots of crystalline metal oxide or cracks and is substantially translucent or transparent. As such, at least some light incident top surface 908 can travel through second portion 912 and reflect off top surface 922 of substrate 902. If top surface 922 is a specularly reflective surface, such as a polished shiny metal surface, light will reflect off of top surface 922. For instance, light ray 918 entering top surface 908 travels through oxide layer 904, reflects off top surface 922, and exits top surface 908 at a first angle. Light ray 920 entering top surface 908 travels through oxide layer 904, reflects off top surface 922, and exits top surface 908 also at the first angle. In this way, the specularly reflective top surface 922 of substrate 902 can be visible through second portion 912 of oxide layer 904 and impart a shiny mirror-like shine to the portion of part 900 corresponding to second portion 912. This combination of diffuse and specular reflection gives part 900 a white and bright appearance. The relative amount of diffuse and specular reflection can be adjusted by choosing an amount of portions of oxide layer 904 having spots 906. The amount of specular reflection of part 900 can be measured using any of a number of light reflection measurement techniques. In some embodiments, a spectrometer configured to measure specular light intensity at specified angles can be used. The measure of specular light intensity is associated with an amount of lightness and L value, as described above. In some embodiments, the amount of specular reflection is compared against a standard to achieve a predetermined amount of specular reflection for part 900.

Figure 9B:
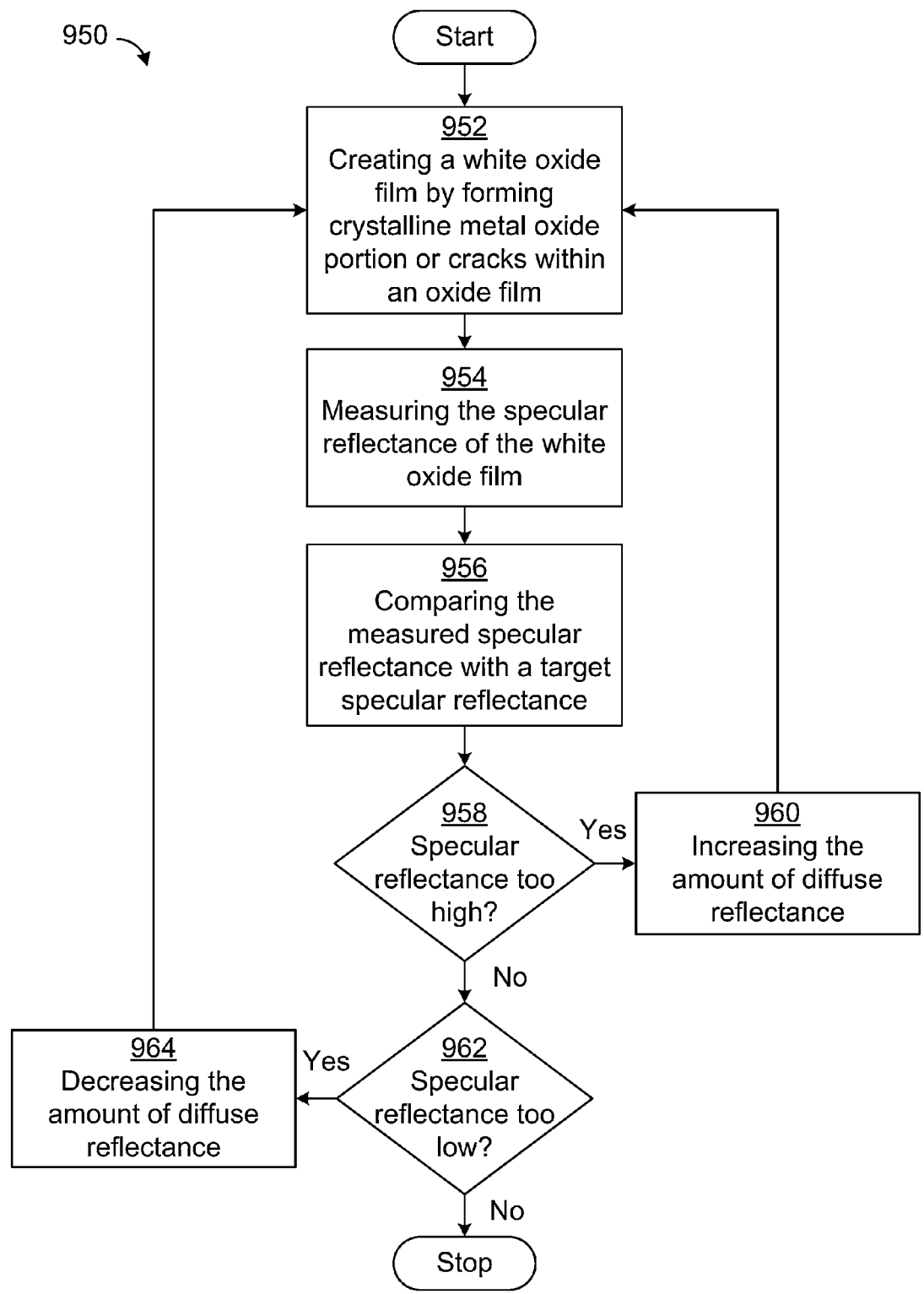
FIG. 9B shows a flowchart indicating a method for tuning a melting process for producing a white oxide film having a target amount of diffuse and specular reflectance.

FIG. 9B shows flowchart 950 indicating a method for tuning a melting process for producing a white oxide film having a target amount of diffuse and specular reflectance. At 952, crystalline metal oxide or cracks are formed within an oxide film creating a white oxide film. In some embodiments, a laser melting procedure is used. The laser will have a set of parameters, such as wavelength, spot size and depth of focus, appropriate for melting metal oxide material within the oxide layer and forming crystalline metal oxide portions or cracks. At 954, the amount of specular reflectance of the white oxide film is measured. A spectrometer may be used. The spectrometer can measure the spectral reflectance at a defined angle and generate a corresponding reflectance spectrum. At 956, the measured specular reflectance of the white oxide film is compared to a target specular reflectance measurement. The target specular reflectance measurement will correspond to a white oxide film having a desired amount of specular and diffuse reflection.

At 958, it is determined from the comparison whether the amount of specular reflectance of the white oxide film is too high. If the specular reflectance is too high, at 960, a new cracking process is designed that has an increased amount of diffuse reflectance. The amount of diffuse reflectance can be increased by increasing the amount of crystalline metal oxide portions or cracks within the oxide film, or changing the positions of the crystalline metal oxide portions or cracks within the oxide film, such as described above with reference to FIGS. 5-7. Then, returning to 952, an additional white oxide film is formed using the new melting process parameters. If the specular reflectance is not too high, at 962, it is determined from the comparison whether the amount of specular reflectance of the white oxide film is too low. If the specular reflectance is too low, at 964, a new melting process is designed that has a decreased amount of diffuse reflectance. The amount of diffuse reflectance can be decreased by decreasing the amount of crystalline metal oxide portions or cracks within the oxide film, or changing the positions of the crystalline metal oxide portions or cracks within the oxide film, such as described above with reference to FIGS. 5-7. Then, returning to 952, an additional white oxide film is formed using the new melting process parameters. If the specular reflectance is not too low, the white oxide film has a target amount of diffuse and specular reflectance.

Figure 10:
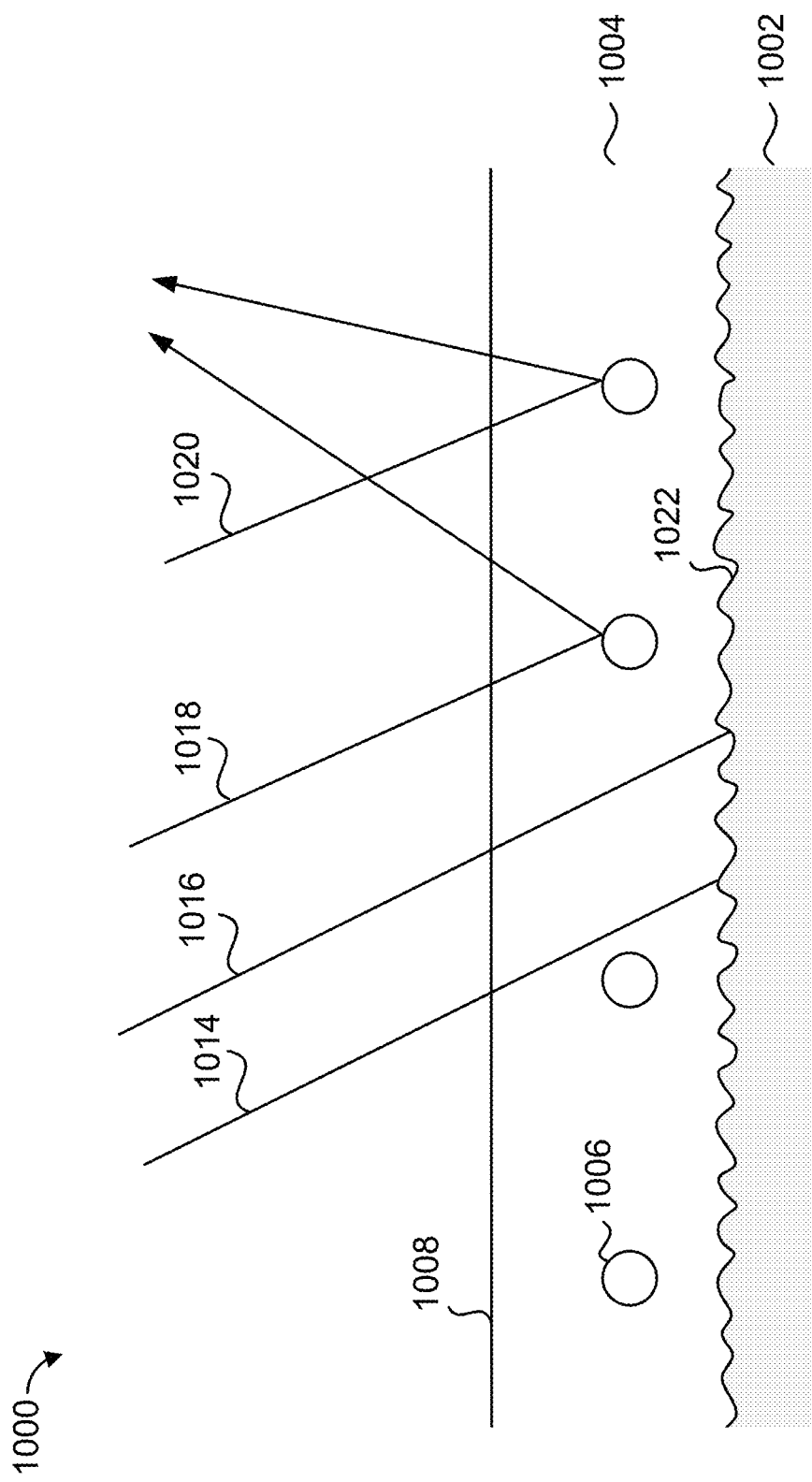
FIG. 10 shows a cross section view of a portion of a part with an oxide layer having light diffusing spots positioned over a substrate having a roughed surface.

In some embodiments, the underlying substrate surface has a different surface quality than a specularly reflective shine. For example, the underlying substrate can have a roughened surface that absorbs incident light and therefore has a dark or black appearance. FIG. 10 shows a cross section view of part 1000, which includes oxide layer 1004 positioned on substrate 1002, which has rough top surface 1022. Rough top surface 1022 can be formed using any suitable process, such as a laser marking technique. In a laser marking technique, the laser wavelength and other process parameters are tuned to travel through oxide layer 1004 and roughen rough top surface 1022 of substrate 1002. Rough top surface 1022 can absorb anywhere from some light to substantially all light incident top surface 1008. For instance, light rays 1014 and 1016 entering top surface 1008 travel through oxide layer 1004 and become absorbed by rough top surface 1022. Oxide layer 1004 also includes spots 1006 of crystalline metal oxide portions or cracks that can diffusely reflect incoming visible light. For instance, light ray 1018 entering top surface 1008 reflects off spots 1006 and exits top surface 1008 at a first angle. Light ray 1020 entering top surface 1008 reflects off spots 1006 and exits top surface 1008 at a second angle that is different than first angle. The combination of light absorption and light diffuse gives part 1000 a unique color and appearance that can be adjusted by modifying the amount of roughness of rough top surface 1022 and the amount of spots 1006 within oxide layer 1004.

Figure 11:
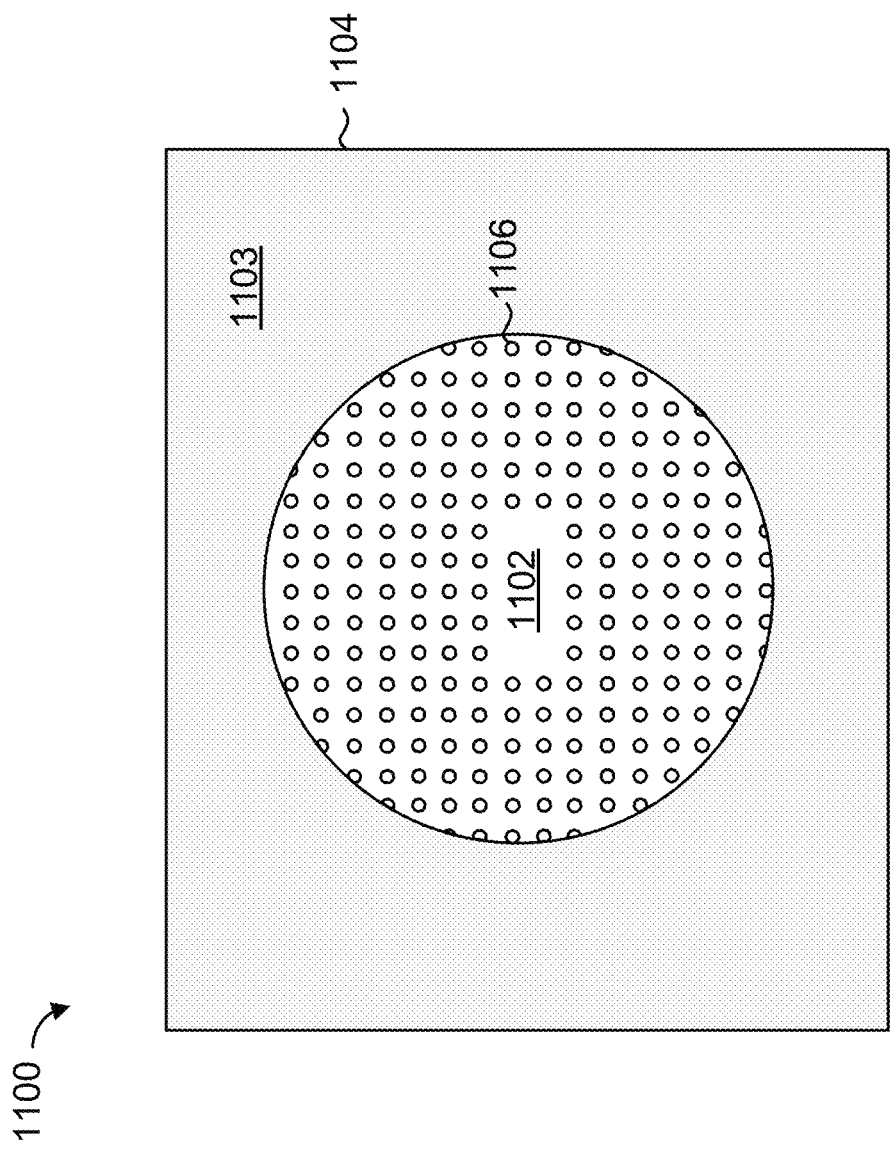
FIG. 11 shows a top view of a part with an oxide layer having light diffusing spots and having different colored portions and in accordance with described embodiments.

In some embodiments, the cracks are formed in a pattern such that a portion of the part appears white while other portions of the part appear as a different color. FIG. 11 shows a top view of part 1100 having different colored portions in accordance with described embodiments. Part 1100 includes an oxide layer 1104 that has a top surface corresponding to a top surface of part 1100. Oxide layer 1104 includes first portion 1102, which has a different appearance than surrounding second portion 1103. First portion 1102 has spots 1106 of crystalline metal oxide portions or cracks that give first portion 1102 a white appearance. In some embodiments, first portion 1102 is in the shape of a design or logo. In some embodiments, second portion 1103 does not substantially include any spots of crystalline metal oxide portions or cracks and, therefore, has a different color than first portion 1102. In some embodiments, second portion 1103 includes spots of crystalline metal oxide portions or cracks and has a different shade of white compared to first portion 1102. Note that in embodiments where a laser beam is used to form spots 1106, spots 1106 can be formed without the use of a masking process. That is, the laser system can be tuned to scan or raster select portions of an oxide layer, such as first portion 1102, without the use of a mask.

In some embodiments, second portion 1103 is substantially translucent or transparent, thereby allowing the underlying metal substrate to show. In some embodiments, the underlying substrate is an aluminum or aluminum alloy and has a silver or grey color that can at least be partially visible through second portion 1103. In some embodiments, the underlying substrate has a reflective surface (e.g., mirror-like shine) that is at least partially visible through second portion 1103, as described above. In some embodiments, second portion 1103 has one or more coloring agents to impart a color to second portion 1103. For example, second portion 1103 can include one or more dye, metal, or metal oxide agents infused within the pores of the oxide material of second portion 1103. In some embodiments, first portion 1102 includes one or more coloring agents that can enhance its white color. For example, first portion 1102 can have one or more dye, metal, and metal oxide agents infused within the pores of the oxide material of first portion 1102.

Figure 12:
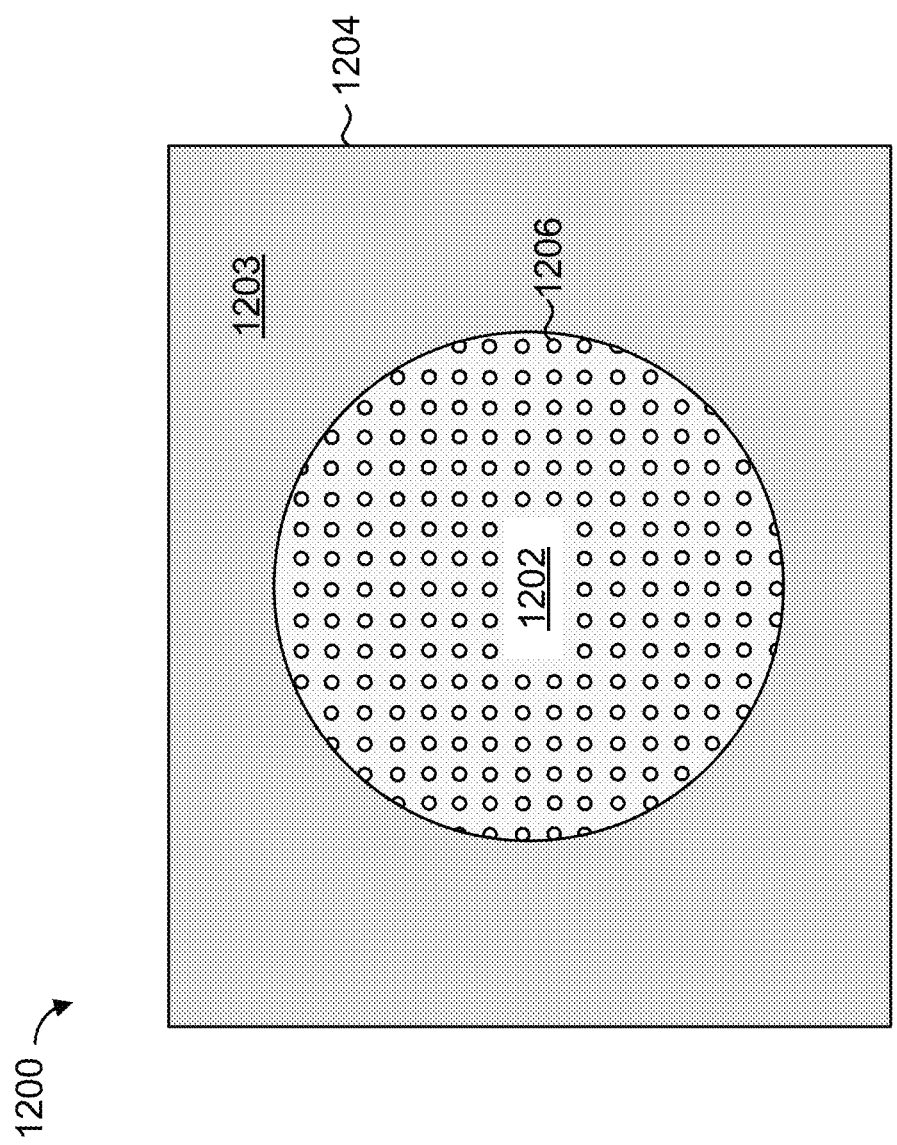
FIG. 12 shows a top view of a part with an oxide layer having light diffusing spots and having different dyed portions and in accordance with described embodiments.

In some embodiments, the cracks are formed subsequent to an oxide film dyeing process such that forming the cracks modifies the color of the dye and results in an oxide film having a different color than imparted by the dye itself. To illustrate, FIG. 12 shows a top view of part 1200 having different dyed portions in accordance with described embodiments. Part 1200 includes an oxide layer 1204 that has a top surface corresponding to a top surface of part 1200. Oxide layer 1204 includes first portion 1202, which has a different appearance than surrounding second portion 1203. In some embodiments, first portion 1202 is in the shape of a design or logo. Both first portion 1202 and second portion 1203 have one or more of the same dye infused therein. However, first portion 1202 has spots 1206 of crystalline metal oxide portions or cracks. During the formation of spots 1206, portions of the metal oxide material within first portion 1202 are heated and melted, as described above. This localized heating can cause the infused dye within first portion 1202 to change color. In some embodiments, the localized heating causes bleaching or lightening of the dye, thereby giving first portion 1202 a lighter color compared to surrounding second portion 1203. As a result, part 1200 has a varied colored look.

Figure 13:
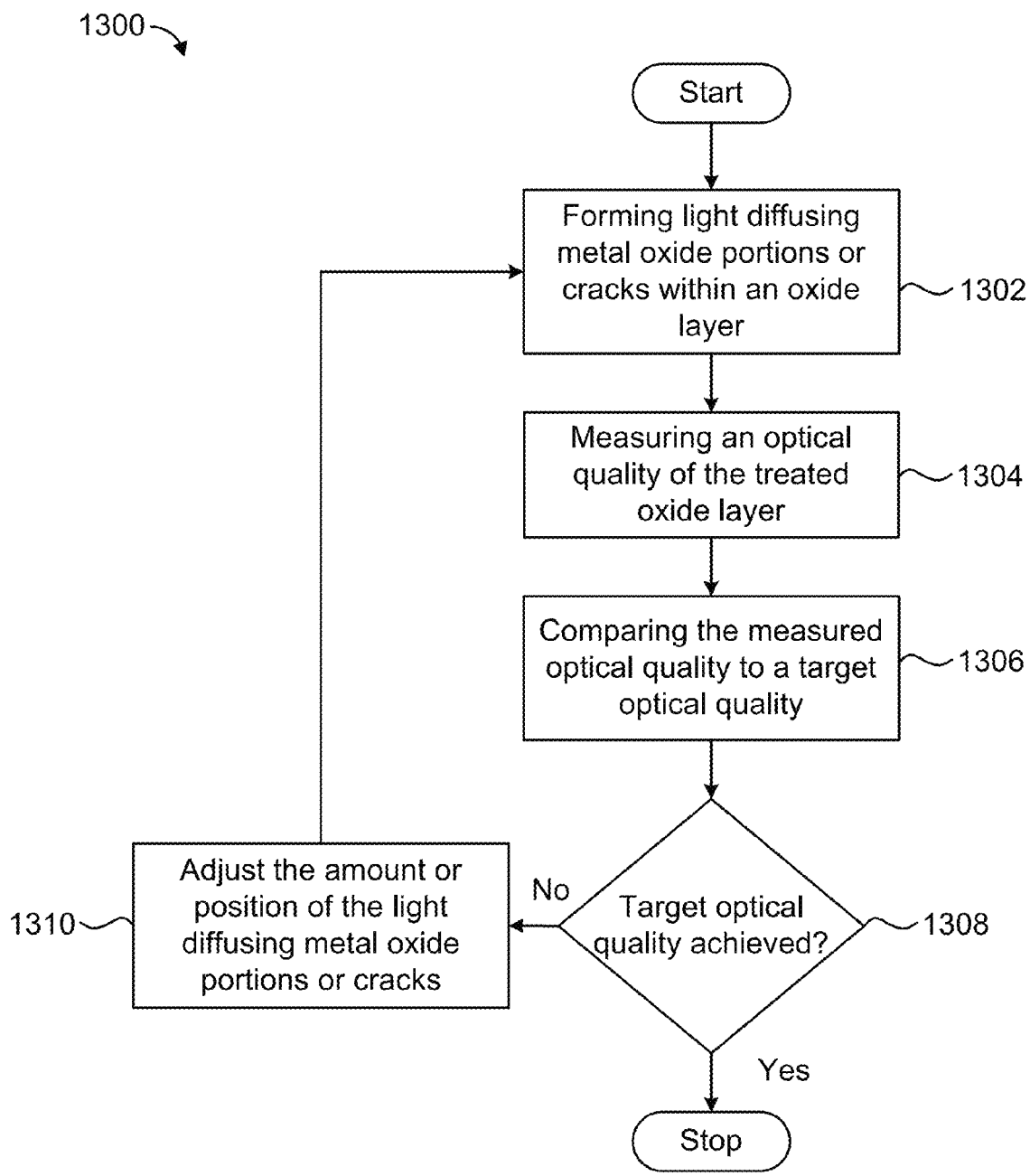
FIG. 13 shows a flowchart indicating a method for forming an oxide layer on a part having a particular optical quality using the described melting methods.

FIG. 13 shows flowchart 1300 indicating a method for forming an oxide layer on a part having a particular optical quality using the melting methods described herein. The optical quality can be a desired color or a desired brightness. At 1302, light diffusing crystalline metal oxide portions or cracks are formed within an oxide layer. The light diffusing crystalline metal oxide portions or cracks can be formed using any suitable method. In some embodiments, the light diffusing crystalline metal oxide portions or cracks are formed by directing a laser beam at a top surface of the oxide layer such that energy from the laser beam is transferred as heat to melt a portion of the metal oxide material within the oxide layer. Crystalline metal oxide portions or cracks form within the oxide layer as the metal oxide material cools and contracts. In some embodiments, the laser is focused such that the crystalline metal oxide portions or cracks form entirely below a top surface of the oxide layer leaving the top surface of the oxide layer substantially crack-free and continuous. In some embodiments, the oxide layer has a smooth and specularly reflective top surface. In some embodiments, the oxide layer has one or more dyes or other coloring agents infused therein. In some embodiments, the heat from the laser beam modifies the color of the dyes or other coloring agents, thereby modifying the color of the oxide layer.

At 1304, an optical quality of the oxide layer is measured after the melting treatment. A color of the treated oxide layer can be measured using any suitable colorimetric methods including, but not limited to, use of a colorimeter, spectrometer and/or a spectrophotometer. The brightness can be measured using any suitable method including, but not limited to, photometric techniques and/or radiometric techniques. At 1306, the optical quality measurement of the treated oxide layer is compared to a target optical quality measurement. In some embodiments, the target optical quality is obtained by measuring the optical quality measurements of a sample that has a predetermined desired optical quality, such as a predefined color or brightness measurement. At 1308, it is determined whether the measured optical quality of the treated oxide layer has achieved the target optical quality. If the target optical quality has not been achieved, at 1310, a new process is design wherein the amount or position of the light diffusing within an oxide layer is adjusted. Then, at 1302, another oxide layer is formed using the new process. This process is repeated until at 1308, the target optical quality is achieved and the process of flowchart 1300 is complete.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not target to be exhaustive or to limit the embodiments to the precise forms disclosed. It will be apparent to one of ordinary skill in the art that many modifications and variations are possible in view of the above teachings.

What is claimed is:

1. A method of forming an anodic film on a part, the method comprising:
   forming a mirror finish on a substrate surface of a metal substrate;
   forming the anodic film on the metal substrate, the anodic film having a first surface adjacent the substrate surface and a second surface opposite the first surface, wherein the mirror finish of the substrate surface is visible through the anodic film; and
   forming clusters of cracks, wherein the clusters of cracks are equidistantly spaced apart and embedded within the anodic film between the first and second surfaces, and wherein visible light incident at the second surface of the anodic film diffusely reflects off the cracks within the clusters, thereby imparting a white appearance to the anodic film.

2. The method of claim 1, wherein forming the clusters of cracks comprises:
   directing a laser beam at the second surface of the anodic film such that a depth of focus of the laser beam is positioned entirely beneath the second surface of the anodic film.

3. The method of claim 2, wherein forming the clusters of cracks further comprises:
   directing the laser beam at the second surface such that the depth of focus of the laser beam is positioned below the substrate surface, thereby causing the laser beam to reflect off the substrate surface and focus within the anodic film.

4. The method of claim 1, wherein forming the clusters of cracks includes melting metal oxide material present within the clusters of cracks.

5. The method of claim 1, wherein a pitch between the clusters of cracks is between about 1 micrometer to about 10 micrometers.

6. The method of claim 1, wherein a pitch between the clusters of cracks is about twice a diameter of each cluster of the clusters of cracks.

7. The method of claim 1, wherein each of the clusters of cracks are positioned at different depths beneath the second surface.

8. The method of claim 1, wherein each of the clusters of cracks have a diameter that is between about 1 micrometer and about 5 micrometers.

9. A part comprising:
a metal substrate having a substrate surface with a mirror finish; and
an anodic film disposed on the metal substrate, the anodic film having a first surface adjacent the substrate surface and a second surface opposite the first surface, wherein the mirror finish of the substrate surface is visible through the anodic film; and
clusters of cracks embedded within the anodic film and between the first and second surfaces, the clusters of cracks being equidistantly spaced apart, wherein visible light incident at the second surface diffusely reflects off the cracks within the clusters, thereby imparting a white appearance to the anodic film.

10. The part of claim 9, wherein the clusters of cracks include crystalline metal oxide material.

11. The part of claim 9, wherein a pitch between the clusters of cracks is between about 1 micrometer to about 10 micrometers.

12. The part of claim 9, wherein a pitch between the clusters of cracks is about twice a diameter of each cluster of the clusters of cracks.

13. The part of claim 9, wherein at least some of the clusters of cracks are embedded at different depths within the anodic film.

14. The part of claim 9, wherein each of the clusters of cracks have irregular surfaces that diffusely reflect the visible light.

15. An enclosure for an electronic device, comprising:
a metal substrate having a substrate surface with a mirror finish; and
an anodic film disposed on the metal substrate, the anodic film having a bottom surface adjacent to the substrate surface, and a top surface opposite from the bottom surface, wherein the mirror finish of the substrate surface is visible through the anodic film; and
clusters of cracks embedded within the anodic film, wherein the clusters of cracks are equidistantly spaced apart from each other, and wherein visible light incident at the top surface diffusely reflects off the clusters of cracks, thereby imparting a white appearance to the anodic film.

16. The enclosure of claim 15, wherein a pitch between the clusters of cracks is about twice a diameter of each cluster of the clusters of cracks.

17. The enclosure of claim 15, wherein a pitch between the clusters of cracks is between about 1 micrometer to about 10 micrometers.

18. The enclosure of claim 15, wherein each of the clusters of cracks have a diameter that is between about 1 micrometer and about 5 micrometers.

19. The enclosure of claim 15, wherein at least some of the clusters of cracks are embedded at different depths within the anodic film.

20. The enclosure of claim 15, wherein the clusters of cracks include crystalline metal oxide material.

* * * * *